United States Patent
Nagel et al.

(10) Patent No.: US 9,061,752 B2
(45) Date of Patent: Jun. 23, 2015

(54) WING AND DEVICES THEREFOR

(71) Applicant: ISRAEL AEROSPACE INDUSTRIES LTD., Lod (IL)

(72) Inventors: Alexander Nagel, Kiryat Ono, IL (US); Shlomo Bauminger, Rishon LeZion (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 268 days.

(21) Appl. No.: 13/674,431

(22) Filed: Nov. 12, 2012

(65) Prior Publication Data

US 2013/0233976 A1    Sep. 12, 2013

(30) Foreign Application Priority Data

Nov. 14, 2011   (IL) .......................... 216345

(51) Int. Cl.
  *B64C 9/00*   (2006.01)
  *B64C 3/48*   (2006.01)

(52) U.S. Cl.
  CPC ... *B64C 9/00* (2013.01); *B64C 3/48* (2013.01); *Y02T 50/145* (2013.01)

(58) Field of Classification Search
  USPC .......................................................... 244/201
  See application file for complete search history.

(56) References Cited

U.S. PATENT DOCUMENTS

| | | | | |
|---|---|---|---|---|
| 2,288,750 A * | 7/1942 | Seeman | .......................... | 244/219 |
| 2,349,858 A * | 5/1944 | Gillmor | .......................... | 244/219 |
| 2,364,006 A * | 11/1944 | Smith | .......................... | 244/215 |
| 2,474,585 A * | 6/1949 | Lloyd | .............................. | 244/13 |
| 2,504,684 A * | 4/1950 | Harper | .......................... | 244/218 |
| 2,937,826 A | 5/1960 | Johnson | | |
| 2,957,662 A * | 10/1960 | Hess | .......................... | 244/134 R |
| 3,136,501 A * | 6/1964 | Barber | .......................... | 244/219 |
| 3,623,684 A * | 11/1971 | Kline | .......................... | 244/134 A |
| 3,711,039 A * | 1/1973 | James | .......................... | 244/214 |
| 4,102,519 A * | 7/1978 | Crosby, Jr. | ..................... | 244/125 |
| 4,296,900 A * | 10/1981 | Krall | .............................. | 244/219 |
| 4,323,209 A * | 4/1982 | Thompson | ................. | 244/199.1 |
| 4,432,516 A * | 2/1984 | Muscatell | ..................... | 244/219 |
| 4,508,295 A * | 4/1985 | Cattaneo et al. | ........... | 244/134 A |
| 4,522,360 A * | 6/1985 | Barnwell et al. | .............. | 244/204 |
| 4,687,159 A * | 8/1987 | Kageorge | .................. | 244/134 A |
| 4,824,053 A * | 4/1989 | Sarh | ........................ | 244/218 |

(Continued)

FOREIGN PATENT DOCUMENTS

WO    WO2010/032241    3/2010

*Primary Examiner* — Christopher P Ellis
*Assistant Examiner* — Medhat Badawi
(74) *Attorney, Agent, or Firm* — Dorsey & Whitney LLP

(57) ABSTRACT

A device and a related method are disclosed for selectively providing a modified aerodynamic flow over a wing under aerodynamic flight conditions with respect to a respective datum aerodynamic flow over an external wing surface of the wing in the absence of the device under similar aerodynamic flight conditions. The device includes a body configured to be movably mounted to the wing for selective displacement between at least two different positions with respect to the external wing surface and having an external body surface. The device includes a motion inducing arrangement coupled to the body and configured for providing the selective displacement. In each position, the body is in a respective superposed relationship with a respective wing surface portion of the wing external surface and the modified aerodynamic flow includes airflow over the external body surface. A wing and an air vehicle including the device are also disclosed.

24 Claims, 19 Drawing Sheets

(56) References Cited

U.S. PATENT DOCUMENTS

| | | | |
|---|---|---|---|
| 4,890,803 A * | 1/1990 | Smith | 244/219 |
| 4,961,549 A * | 10/1990 | LaRue | 244/134 A |
| 5,248,116 A * | 9/1993 | Rauckhorst | 244/134 A |
| 5,314,145 A * | 5/1994 | Rauckhorst, III | 244/134 A |
| 5,433,404 A | 7/1995 | Ashill et al. | |
| 6,443,394 B1 | 9/2002 | Weisend, Jr. | |
| 6,467,733 B1 * | 10/2002 | Young et al. | 244/215 |
| 6,786,457 B2 | 9/2004 | Dockter et al. | |
| 6,910,661 B2 | 6/2005 | Dockter et al. | |
| 7,178,760 B2 * | 2/2007 | Bernard | 244/134 E |
| 7,195,210 B2 | 3/2007 | Hamilton et al. | |
| 7,448,578 B2 * | 11/2008 | Clark | 244/213 |
| 7,510,143 B1 * | 3/2009 | Bertelsen et al. | 244/46 |
| 7,954,769 B2 * | 6/2011 | Bushnell | 244/213 |
| 8,016,245 B2 * | 9/2011 | Hassan et al. | 244/200.1 |
| 8,083,185 B2 * | 12/2011 | Konings et al. | 244/199.4 |
| 8,113,470 B1 * | 2/2012 | Motosko, III | 244/219 |
| 8,128,038 B2 * | 3/2012 | Whitehouse et al. | 244/214 |
| 8,235,329 B1 * | 8/2012 | Darling | 244/198 |
| 2006/0118675 A1 * | 6/2006 | Tidwell | 244/123.1 |
| 2006/0144992 A1 * | 7/2006 | Jha et al. | 244/46 |
| 2007/0278354 A1 | 12/2007 | Shepshelovich et al. | |
| 2009/0146000 A1 * | 6/2009 | Bushnell | 244/46 |
| 2011/0084174 A1 * | 4/2011 | Hemmelgarn et al. | 244/200 |
| 2012/0061523 A1 * | 3/2012 | Havar et al. | 244/214 |

\* cited by examiner

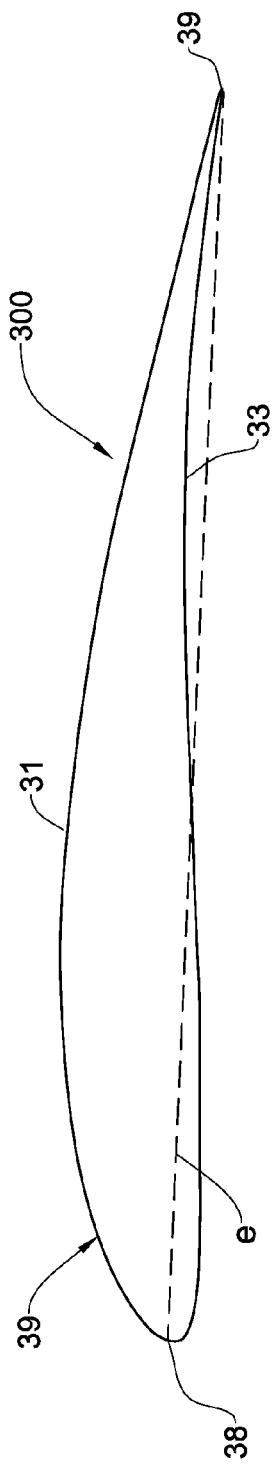
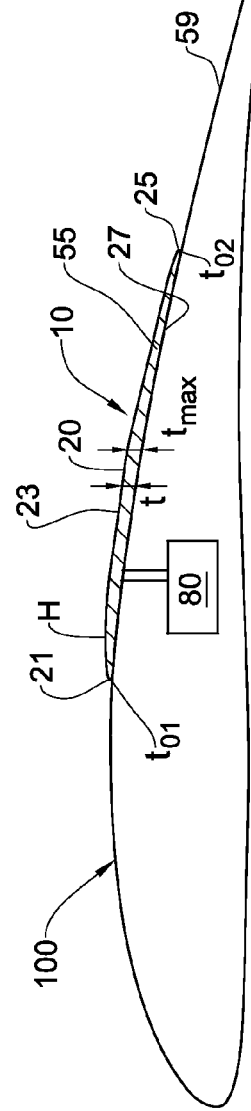
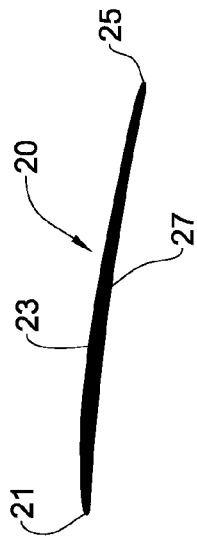

| Upper surface | |
|---|---|
| 1.000 | 0.000 |
| 0.97666 | 0.007242 |
| 0.946611 | 0.014864 |
| 0.915225 | 0.022687 |
| 0.883685 | 0.030479 |
| 0.852131 | 0.038166 |
| 0.820564 | 0.045645 |
| 0.788994 | 0.052905 |
| 0.757422 | 0.05994 |
| 0.725854 | 0.066746 |
| 0.69429 | 0.073316 |
| 0.662719 | 0.079594 |
| 0.631129 | 0.085533 |
| 0.599532 | 0.091062 |
| 0.567922 | 0.096159 |
| 0.536321 | 0.100866 |
| 0.504798 | 0.105219 |
| 0.473401 | 0.10921 |
| 0.442291 | 0.112682 |
| 0.411528 | 0.115478 |
| 0.380714 | 0.117481 |
| 0.349252 | 0.118472 |
| 0.317457 | 0.118121 |
| 0.285689 | 0.116779 |
| 0.25425 | 0.114791 |
| 0.22331 | 0.111896 |
| 0.192998 | 0.107777 |
| 0.163287 | 0.102151 |
| 0.134293 | 0.094861 |
| 0.106271 | 0.08576 |
| 0.079555 | 0.074673 |
| 0.054714 | 0.061569 |
| 0.032832 | 0.046531 |
| 0.015417 | 0.030198 |
| 0.004442 | 0.014717 |
| 0.000 | 0.000 |

| Lower surface | |
|---|---|
| 0.000 | 0.000 |
| 0.004555 | -0.00876 |
| 0.018046 | -0.01568 |
| 0.039306 | -0.0206 |
| 0.065964 | -0.02342 |
| 0.094839 | -0.0245 |
| 0.124538 | -0.02429 |
| 0.154581 | -0.02316 |
| 0.18481 | -0.02135 |
| 0.215163 | -0.01902 |
| 0.24562 | -0.01631 |
| 0.276181 | -0.01329 |
| 0.306861 | -0.01007 |
| 0.337617 | -0.00671 |
| 0.368391 | -0.0033 |
| 0.399165 | 0.000088 |
| 0.429932 | 0.003403 |
| 0.460638 | 0.006576 |
| 0.491257 | 0.009549 |
| 0.521797 | 0.01227 |
| 0.552296 | 0.014697 |
| 0.582831 | 0.016796 |
| 0.613361 | 0.018532 |
| 0.643852 | 0.019874 |
| 0.674342 | 0.020796 |
| 0.704851 | 0.021266 |
| 0.735357 | 0.021253 |
| 0.765756 | 0.020725 |
| 0.796011 | 0.019661 |
| 0.826407 | 0.018042 |
| 0.856824 | 0.015878 |
| 0.887047 | 0.013203 |
| 0.917351 | 0.010008 |
| 0.947622 | 0.006318 |
| 0.976588 | 0.002326 |
| 1.000 | 0.000 |

FIG. 2b

| Upper surface | | Lower surface | |
|---|---|---|---|
| 1.000 | 0.000 | 0.000 | 0.000 |
| 0.97666 | 0.007242 | 0.004555 | -0.00876 |
| 0.946611 | 0.014864 | 0.018046 | -0.01568 |
| 0.915225 | 0.022687 | 0.039306 | -0.0206 |
| 0.883685 | 0.030479 | 0.065964 | -0.02342 |
| 0.852131 | 0.038166 | 0.094839 | -0.0245 |
| 0.820564 | 0.045645 | 0.124538 | -0.02429 |
| 0.788994 | 0.052905 | 0.154581 | -0.02316 |
| 0.757422 | 0.05994 | 0.18481 | -0.02135 |
| 0.725862 | 0.066866 | 0.215163 | -0.01902 |
| 0.694365 | 0.073872 | 0.24562 | -0.01631 |
| 0.662905 | 0.0808 | 0.276181 | -0.01329 |
| 0.631441 | 0.087482 | 0.306861 | -0.01007 |
| 0.599961 | 0.093744 | 0.337617 | -0.00671 |
| 0.56843 | 0.099439 | 0.368391 | -0.0033 |
| 0.536853 | 0.10448 | 0.399165 | 0.000088 |
| 0.505292 | 0.108791 | 0.429932 | 0.003403 |
| 0.473797 | 0.112313 | 0.460638 | 0.006576 |
| 0.442563 | 0.115026 | 0.491257 | 0.009549 |
| 0.411682 | 0.11695 | 0.521797 | 0.01227 |
| 0.380779 | 0.118125 | 0.552296 | 0.014697 |
| 0.349265 | 0.118552 | 0.582831 | 0.016796 |
| 0.317457 | 0.118121 | 0.613361 | 0.018532 |
| 0.285689 | 0.116779 | 0.643852 | 0.019874 |
| 0.25425 | 0.114791 | 0.674342 | 0.020796 |
| 0.22331 | 0.111896 | 0.704851 | 0.021266 |
| 0.192998 | 0.107777 | 0.735357 | 0.021253 |
| 0.163287 | 0.102151 | 0.765756 | 0.020725 |
| 0.134293 | 0.094861 | 0.796011 | 0.019661 |
| 0.106271 | 0.08576 | 0.826407 | 0.018042 |
| 0.079555 | 0.074673 | 0.856824 | 0.015878 |
| 0.054714 | 0.061569 | 0.887047 | 0.013203 |
| 0.032832 | 0.046531 | 0.917351 | 0.010008 |
| 0.015417 | 0.030198 | 0.947622 | 0.006318 |
| 0.004442 | 0.014717 | 0.976588 | 0.002326 |
| 0.000 | 0.000 | 1.000 | 0.000 |

FIG. 6a

| | |
|---|---|
| 0.69429 | 0.073316 |
| 0.662719 | 0.079594 |
| 0.631129 | 0.085533 |
| 0.599532 | 0.091062 |
| 0.567922 | 0.096159 |
| 0.536321 | 0.100866 |
| 0.500000 | 0.105219 |
| 0.473401 | 0.10921 |
| 0.442291 | 0.112682 |
| 0.411528 | 0.115478 |
| 0.380714 | 0.117481 |
| 0.349252 | 0.118472 |
| 0.317457 | 0.118121 |
| 0.301547 | 0.117518 |

| | |
|---|---|
| 0.694365 | 0.073872 |
| 0.662905 | 0.0808 |
| 0.631441 | 0.087482 |
| 0.599961 | 0.093744 |
| 0.56843 | 0.099439 |
| 0.536853 | 0.10448 |
| 0.500000 | 0.108791 |
| 0.473797 | 0.112313 |
| 0.442563 | 0.115026 |
| 0.411682 | 0.11695 |
| 0.380779 | 0.118125 |
| 0.349265 | 0.118552 |
| 0.317457 | 0.118121 |

FIG. 6b

| Upper surface | | Lower surface | |
|---|---|---|---|
| 1.000 | 0.000 | 0.000 | 0.000 |
| 0.97666 | 0.007242 | 0.004555 | -0.00876 |
| 0.946611 | 0.014864 | 0.018046 | -0.01568 |
| 0.915225 | 0.022687 | 0.039306 | -0.0206 |
| 0.883685 | 0.030479 | 0.065964 | -0.02342 |
| 0.852131 | 0.038166 | 0.094839 | -0.0245 |
| 0.820564 | 0.045645 | 0.124538 | -0.02429 |
| 0.788984 | 0.052909 | 0.154581 | -0.02316 |
| 0.757531 | 0.060545 | 0.18481 | -0.02135 |
| 0.72616 | 0.068342 | 0.215163 | -0.01902 |
| 0.694777 | 0.075879 | 0.24562 | -0.01631 |
| 0.663362 | 0.082983 | 0.276181 | -0.01329 |
| 0.631855 | 0.089464 | 0.306861 | -0.01007 |
| 0.600217 | 0.095027 | 0.337617 | -0.00671 |
| 0.568486 | 0.099709 | 0.368391 | -0.0033 |
| 0.53673 | 0.103611 | 0.399165 | 0.000088 |
| 0.505055 | 0.106976 | 0.429932 | 0.003403 |
| 0.473532 | 0.110097 | 0.460638 | 0.006576 |
| 0.442335 | 0.112937 | 0.491257 | 0.009549 |
| 0.411528 | 0.115478 | 0.521797 | 0.01227 |
| 0.380714 | 0.117481 | 0.552296 | 0.014697 |
| 0.349252 | 0.118472 | 0.582831 | 0.016796 |
| 0.317457 | 0.118121 | 0.613361 | 0.018532 |
| 0.285689 | 0.116779 | 0.643852 | 0.019874 |
| 0.25425 | 0.114791 | 0.674342 | 0.020796 |
| 0.22331 | 0.111896 | 0.704851 | 0.021266 |
| 0.192998 | 0.107777 | 0.735357 | 0.021253 |
| 0.163287 | 0.102151 | 0.765756 | 0.020725 |
| 0.134293 | 0.094861 | 0.796011 | 0.019661 |
| 0.106271 | 0.08576 | 0.826407 | 0.018042 |
| 0.079555 | 0.074673 | 0.856824 | 0.015878 |
| 0.054714 | 0.061569 | 0.887047 | 0.013203 |
| 0.032832 | 0.046531 | 0.917351 | 0.010008 |
| 0.015417 | 0.030198 | 0.947622 | 0.006318 |
| 0.004442 | 0.014717 | 0.976588 | 0.002326 |
| 0.000 | 0.000 | 1.000 | 0.000 |

FIG. 6c

| Upper surface | |
|---|---|
| 1.000 | 0.000 |
| 0.97666 | 0.007242 |
| 0.946611 | 0.014864 |
| 0.915225 | 0.022687 |
| 0.88378 | 0.030863 |
| 0.852657 | 0.040201 |
| 0.821531 | 0.049399 |
| 0.79018 | 0.057639 |
| 0.758702 | 0.065297 |
| 0.72714 | 0.072432 |
| 0.695466 | 0.078758 |
| 0.663705 | 0.084225 |
| 0.631837 | 0.08875 |
| 0.599919 | 0.092549 |
| 0.56807 | 0.096386 |
| 0.536369 | 0.10072 |
| 0.504814 | 0.105171 |
| 0.473387 | 0.10925 |
| 0.442282 | 0.112712 |
| 0.411528 | 0.115478 |
| 0.380714 | 0.117481 |
| 0.349252 | 0.118472 |
| 0.317457 | 0.118121 |
| 0.285689 | 0.116779 |
| 0.25425 | 0.114791 |
| 0.22331 | 0.111896 |
| 0.192998 | 0.107777 |
| 0.163287 | 0.102151 |
| 0.134293 | 0.094861 |
| 0.106271 | 0.08576 |
| 0.079555 | 0.074673 |
| 0.054714 | 0.061569 |
| 0.032832 | 0.046531 |
| 0.015417 | 0.030198 |
| 0.004442 | 0.014717 |
| 0.0008 | 0.000 |

| Lower surface | |
|---|---|
| 0.000 | 0.000 |
| 0.004555 | -0.00876 |
| 0.018046 | -0.01568 |
| 0.039306 | -0.0206 |
| 0.065964 | -0.02342 |
| 0.094839 | -0.0245 |
| 0.124538 | -0.02429 |
| 0.154581 | -0.02316 |
| 0.18481 | -0.02135 |
| 0.215163 | -0.01902 |
| 0.24562 | -0.01631 |
| 0.276181 | -0.01329 |
| 0.306861 | -0.01007 |
| 0.337617 | -0.00671 |
| 0.368391 | -0.0033 |
| 0.399165 | 0.000088 |
| 0.429932 | 0.003403 |
| 0.460638 | 0.006576 |
| 0.491257 | 0.009549 |
| 0.521797 | 0.01227 |
| 0.552296 | 0.014697 |
| 0.582831 | 0.016796 |
| 0.613361 | 0.018532 |
| 0.643852 | 0.019874 |
| 0.674342 | 0.020796 |
| 0.704851 | 0.021266 |
| 0.735357 | 0.021253 |
| 0.765756 | 0.020725 |
| 0.796011 | 0.019661 |
| 0.826407 | 0.018042 |
| 0.856824 | 0.015878 |
| 0.887047 | 0.013203 |
| 0.917351 | 0.010008 |
| 0.947622 | 0.006318 |
| 0.976588 | 0.002326 |
| 1.000 | 0.000 |

FIG. 6d

WING AND DEVICES THEREFOR

CROSS-REFERENCE TO RELATED APPLICATIONS

This application claims priority to Israel Patent Application No. 216345 filed on 14 Nov. 2011, the contents of which are incorporated herein, in their entirety, by this reference.

TECHNICAL FIELD

The presently disclosed subject matter relates to devices for modifying wing geometry and/or aerodynamic characteristics of wings, and to wings thus modified.

BACKGROUND

Geometric profiles of aerofoils, including wings, propeller blades, rotor/turbine blades, stabilizers, and so on, are in general optimized for a design set of conditions or a design point or aspect of a mission profile, for example high lift, endurance, low drag and so on. Nevertheless, devices such as leading edge slats and/or trailing edge flaps, permit the geometry of the aerofoil to be varied to a limited degree while airborne, and thus enable operation of the aerofoil at other conditions.

However, aircraft that need at times to operate under a wide range of different conditions may incorporate aerofoil geometries that provide adequate performance for the range of conditions, albeit at a performance loss as compared with the optimum performance that may be obtained at any specific set of conditions with an aerofoil geometry designed for such a set of conditions.

Wing design for UAV applications requires a special approach which can be different from conventional manned aircraft. The main goal of operational UAV is often endurance flight at relatively low speed, and maximum lift is a primary factor to achieve high endurance values. Conventionally, an engineering compromise is reached between providing maximum lift, reducing drag penalty for high lift flight and providing flight envelope capabilities from low-lift maximum speed flight up to stall lift levels. Speed safety margins and acceptable stall characteristics are also factors conventionally considered in wing design.

In small UAV applications and at lower flight speeds, the aerodynamic flow over corresponding wings is typically low in air flow energy. This behavior, which is described by low values of Reynolds number, brings specific wing design features. The laminar-turbulent flow transition can become the critically important design point, different from conventional large-scale airplanes where the flow is usually turbulent. The two main parameters that define drag level for low Reynolds airfoil are: level of laminarity (extent of laminar flow before turbulent transition) and the size of laminar separation bubble. Increasing the laminar separation bubble may cause lift increment but on the other hand increases the possibility of bubble burst. The drag increases proportionally to separation bubble size, and the rear part of airfoil must provide enough length for pressure recovery after the laminar-turbulent transition, hence limiting airfoil laminar extent. For two-element airfoils there is the additional issue of very low local Reynolds numbers on the second element increasing risk of flow separation, especially when the second element is in a deflected position. The conventional engineering optimum is finding a compromise between the aforementioned parameters.

WO 2010/032241, assigned to the present Assignee, discloses aerofoil accessories configured for selective attachment to a wing element, the wing element having an outer facing aerofoil surface and being based on at least one datum aerofoil section. Each accessory provides a modified geometric profile to a datum profile of the at least one aerofoil section when attached to the wing element. The accessories are each configured for having a substantially fixed geometric profile with respect to the at least one datum aerofoil section at least whenever said wing element is airborne with the respective accessory attached to the wing element. The modified geometric profile is such as to provide said wing element with the accessory attached thereto with a desired change in performance relative to a datum performance provided by the wing element absent the accessory.

By way of general background, a number of inflatable or shape changing devices are known for altering the shape of aerofoils. For example, in U.S. Pat. No. 6,443,394, an airfoil device is provided for attachment to the wing of an aircraft. The airfoil device has a chamber which is inflatable to provide a lift-enhancing airfoil geometry to the wing and other chambers which are inflatable to provide deicing forces to remove ice accumulation on the wing. When installed on the wing, the airfoil device closely conforms to the wing's airfoil geometry (e.g., low camber, sharp leading edge) when the lift-enhancing chamber and the deicing chambers are in a deflated condition. The lift-enhancing chamber can be inflated during take-off and landing to provide a high camber and less sharp airfoil geometry. If ice accumulates on the wing during high speed flight, the deicing chambers can be repeatedly inflated/deflated for ice removal purposes. As another example, in U.S. Pat. No. 7,195,210, an airfoil member is provided including a geometric morphing device. The geometric morphing device has an inflatable member. The inflatable member has an exterior wall and multiple inflated states. Multiple layers are coupled to at least a portion of the exterior wall and control size, shape, and expansion ability of the geometric morphing device. The geometric morphing device is adjustable in size and shape by changing inflated state of the inflatable member. An airfoil member altering system and a method of performing the same are also provided as well as a method of forming the geometric morphing device.

There are also improvements that may be desired to be incorporated to an existing aerofoil design. For example, US2007/0278354, assigned to the present Assignee, and the contents of which are incorporated herein in their entirety, discloses a high lift, two-element, mild stall wing based on a corresponding high lift, two-element, mild stall aerofoils. An aerodynamic feature referred to as a mild stall ramp, or MS-ramp, is provided at the aft portion of the main body of the aerofoil, on the suction surface thereof, while retaining the bluntness of the leading edge of the aerofoil. Gradual development of separated flow on the MS-ramp, combined with continuous lift build-up at the forward portion of the aerofoil produces mild stall characteristics at the extended range of post-stall angles of attack, and combines features of adaptive geometry with stall/post-stall flight capabilities at the level of maximum lift that is inherent to two-element aerofoils.

The following publications are also provided by way of general background: U.S. Pat. Nos. 2,504,684; 2,937,826; 5,433,404; 6,786,457; and 6,910,661.

SUMMARY

According to an aspect of the presently disclosed subject matter there is provided a device for selectively providing a modified aerodynamic flow over a wing under aerodynamic flight conditions with respect to a respective datum aerodynamic flow over an external wing surface of the wing in the absence of said device under said aerodynamic flight conditions, the device comprising:

a body configured to be movably mounted to the wing for selective displacement between at least two different positions with respect to said external wing surface and having an external body surface, and a motion inducing arrangement coupled to said body and configured for providing said selective displacement, wherein in each said position said body is in a respective superposed relationship with a respective wing surface portion of the wing external surface and said modified aerodynamic flow includes airflow over said external body surface.

The device can be configured for compelling said modified aerodynamic flow over the wing to be directed over said external body surface while concurrently preventing said modified aerodynamic flow over the wing to be directed over said respective wing surface portion.

Additionally or alternatively, said modified aerodynamic flow excludes an airflow over said respective wing surface portion that is superposed by said body.

Additionally or alternatively, said external body surface is configured for being exposed to the airflow in operation of the device.

Additionally or alternatively, said body is configured for selective displacement with respect to the external wing surface via sliding displacement between said body and the external wing surface.

Additionally or alternatively, said displacement is along a direction generally tangential to the wing external surface.

Additionally or alternatively, said displacement is along a general chord direction of the wing.

Additionally or alternatively, said displacement is along a general span direction of the wing.

Additionally or alternatively, said body comprises a body leading edge and a body trailing edge, and said external body surface extends therebetween. Optionally, each one of said body leading edge said body trailing edge being configured for being in sealing contact with the external wing surface at least during operation of the device.

Additionally or alternatively, said body comprises a body thickness varying from a first minimum thickness at a body leading edge, a second minimum thickness at a body trailing edge, and a maximum body thickness therebetween.

Additionally or alternatively, said body comprises an interface configured for conforming said body to a profile of each said respective wing surface portion.

Additionally or alternatively, said body is at least sufficiently flexible to enable said body to conform to said profile of each said respective wing surface portion.

Additionally or alternatively, said body is made from a flexible material.

Additionally or alternatively, said body defines an enclosed volume, at least with respect to each said respective wing surface portion. For example, said enclosed volume comprises a suitable flowable material. For example, said flowable material includes at least one of a gas, liquid, gel or solid.

Additionally or alternatively, the body leading edge and the body trailing edge are selectively spaceable from one another within a range of predetermined spacings at least at one said position.

Additionally or alternatively, in a first said position, said modified aerodynamic flow provides a wing drag reduction as compared with a datum wing drag provided by said datum aerodynamic flow over said wing in the absence of said device. For example, said first position is between 10% and 70% of the wing chord from a leading edge of the wing. For example, said first position is at 50% of the wing chord from a leading edge of the wing. For example, said first position corresponds to a position of a laminar-turbulent transition line on said external wing surface. For example, said first position is varied to coincide with a respective position of a laminar separation bubble on said external wing surface.

Additionally or alternatively, in a second said position, said modified aerodynamic flow provides mild stall characteristics to the wing as compared with stall characteristics provided by said datum aerodynamic flow over said wing in the absence of said device. For example, said second position is at 70% of the wing chord from a leading edge of the wing.

Additionally or alternatively, in a third said position, said modified aerodynamic flow provides a wing drag increment as compared with a datum wing drag provided by said datum aerodynamic flow over said wing in the absence of said device. For example, said third position is between 20% and 40% of the wing chord from a leading edge of the wing. For example, said third position is at 35% of the wing chord from a leading edge of the wing.

Additionally or alternatively, in a fourth said position, said modified aerodynamic flow provides a wing lift increment as compared with a datum wing lift provided by said datum aerodynamic flow over said wing in the absence of said device. For example, said fourth position is between 5% and 30% of the wing chord from a leading edge of the wing. For example, said fourth position is at 15% of the wing chord from a leading edge of the wing.

For example, one said such position, for example said first position and/or said second position and/or said third position and/or said fourth position, is on the suction surface of the wing.

Additionally or alternatively, at least one said position is on the pressure surface of the wing.

Additionally or alternatively, said aerodynamic flight conditions include laminar flight conditions Additionally or alternatively, said displacement is carried out during said aerodynamic flight conditions.

Additionally or alternatively, said motion inducing arrangement comprises a motor coupled to a strap for providing motion thereto, said strap being in at least partial overlying relationship with said external wing surface and connected to said body. Optionally, said motor is housed within the wing.

Additionally or alternatively, said motion inducing arrangement comprises an actuator coupled to said body for providing motion thereto via a coupling. For example, said actuator is housed within the wing.

Additionally or alternatively, the device comprises a suitable controller for controlling operation of said motion inducing arrangement.

Additionally or alternatively, the wing is based on a single element aerofoil.

Additionally or alternatively, the wing is based on a two element aerofoil, comprising a primary element, an optionally pivotable secondary element, and a slot therebetween. For example, said body is configured for being movably mounted to said primary element. For example, said body is configured for being movably mounted to said secondary element. For example, a first said body is configured for being movably mounted to said primary element, and a second said body is configured for being movably mounted to said secondary element.

According to an aspect of the presently disclosed subject matter there is also provided a wing comprising a device as defined above. For example, the wing is configured for operating at Reynolds numbers within a range 100 to $1*10^6$; for example, the wing is configured for operating at Reynolds numbers within a range 100 to $1*10^6$, at least when the wing is airborne (i.e., the wing is on an air vehicle that is airborne); for example, the wing is configured for operating at Reynolds numbers within a range 100 to $1*10^6$, at least when the wing is subject to an aerodynamic flow corresponding to aerodynamic flight conditions.

According to an aspect of the presently disclosed subject matter there is also provided a air vehicle comprising a wing as defined above. For example, said air vehicle is a UAV or a manned air vehicle.

According to an aspect of the presently disclosed subject matter there is also provided a method for selectively providing a modified aerodynamic flow over a wing under aerodynamic flight conditions with respect to a respective datum aerodynamic flow over an external wing surface of the wing under said aerodynamic flight conditions, the method comprising
- movably mounting a body on said external wing surface, said body having an external body surface;
- selectively displacing said body between at least two different positions with respect to said external wing surface;
- wherein in each said position said body is in a respective superposed relationship with a respective wing surface portion of the wing external surface and said modified aerodynamic flow includes airflow over said external body surface.

For example, said modified aerodynamic flow over the wing is compelled to be directed over said external body surface while concurrently preventing said modified aerodynamic flow over the wing to be directed over said respective wing surface portion.

Additionally or alternatively, said modified aerodynamic flow excludes an airflow over said respective wing surface portion that is superposed by said body.

Additionally or alternatively, said external body surface is exposed to the airflow in operation of the device.

Additionally or alternatively, said body is selective displaced with respect to the external wing surface via sliding displacement between said body and the external wing surface.

Additionally or alternatively, said displacement is along a direction generally tangential to the wing external surface.

Additionally or alternatively, said displacement is along a general chord direction of the wing.

Additionally or alternatively, said displacement is along a general span direction of the wing.

Additionally or alternatively, in a first said position, said modified aerodynamic flow provides a wing drag reduction as compared with a datum wing drag provided by said datum aerodynamic flow over said wing in the absence of said device. For example, said first position is between 10% and 70% of the wing chord from a leading edge of the wing. For example, said first position is at 50% of the wing chord from a leading edge of the wing. For example, said first position corresponds to a position of a laminar-turbulent transition line on said external wing surface. For example, said first position is varied to coincide with a respective position of a laminar separation bubble on said external wing surface.

Additionally or alternatively, in a second said position, said modified aerodynamic flow provides mild stall characteristics to the wing as compared with stall characteristics provided by said datum aerodynamic flow over said wing in the absence of said device. For example, said second position is at 70% of the wing chord from a leading edge of the wing.

Additionally or alternatively, in a third said position, said modified aerodynamic flow provides a wing drag increment as compared with a datum wing drag provided by said datum aerodynamic flow over said wing in the absence of said device. For example, said third position is between 20% and 40% of the wing chord from a leading edge of the wing. For example, said third position is at 35% of the wing chord from a leading edge of the wing.

Additionally or alternatively, in a fourth said position, said modified aerodynamic flow provides a wing lift increment as compared with a datum wing lift provided by said datum aerodynamic flow over said wing in the absence of said device. For example, said fourth position is between 5% and 30% of the wing chord from a leading edge of the wing. For example, said fourth position is at 15% of the wing chord from a leading edge of the wing.

For example, one said such position, for example said first position and/or said second position and/or said third position and/or said fourth position, is on the suction surface of the wing.

Additionally or alternatively, at least one said position is on the pressure surface of the wing.

Additionally or alternatively, said aerodynamic flight conditions include laminar flight conditions Additionally or alternatively, said displacement is carried out during said aerodynamic flight conditions.

Additionally or alternatively, the wing is configured for operating at Reynolds numbers within a range 100 to $1*10^6$; for example, the wing is configured for operating at Reynolds numbers within a range 100 to $1*10^6$, at least when the wing is airborne (i.e., the wing is on an air vehicle that is airborne); for example, the wing is configured for operating at Reynolds numbers within a range 100 to $1*10^6$, at least when the wing is subject to an aerodynamic flow corresponding to aerodynamic flight conditions.

BRIEF DESCRIPTION OF THE DRAWINGS

In order to understand the presently disclosed subject and to see how it may be carried out in practice, non-limiting examples will now be described with reference to the accompanying drawings, in which:

FIG. 2a is an aerofoil profile on which the wing element example of FIG. 1 is based; FIG. 2b is a listing of Cartesian coordinates of the aerofoil profile of FIG. 2a.

FIG. 3a is a side view of profile modifying device example of FIG. 1; FIG. 3b is a side view of the profile modifying device example and wing element example of FIG. 1.

FIG. 6a is a listing of Cartesian coordinates of the aerofoil profile of FIG. 5c including the respective profile modifying device example at a 50% chord position; FIG. 6b is a listing of Cartesian coordinates of the profile modifying device example of FIG. 5c at a 50% chord position; FIG. 6c is a listing of Cartesian coordinates of the aerofoil profile of FIG. 5c including the respective profile modifying device example at a 60% chord position; FIG. 6d is a listing of Cartesian coordinates of the aerofoil profile of FIG. 5c including the respective profile modifying device example at a 70% chord position.

DETAILED DESCRIPTION

Figure 1:
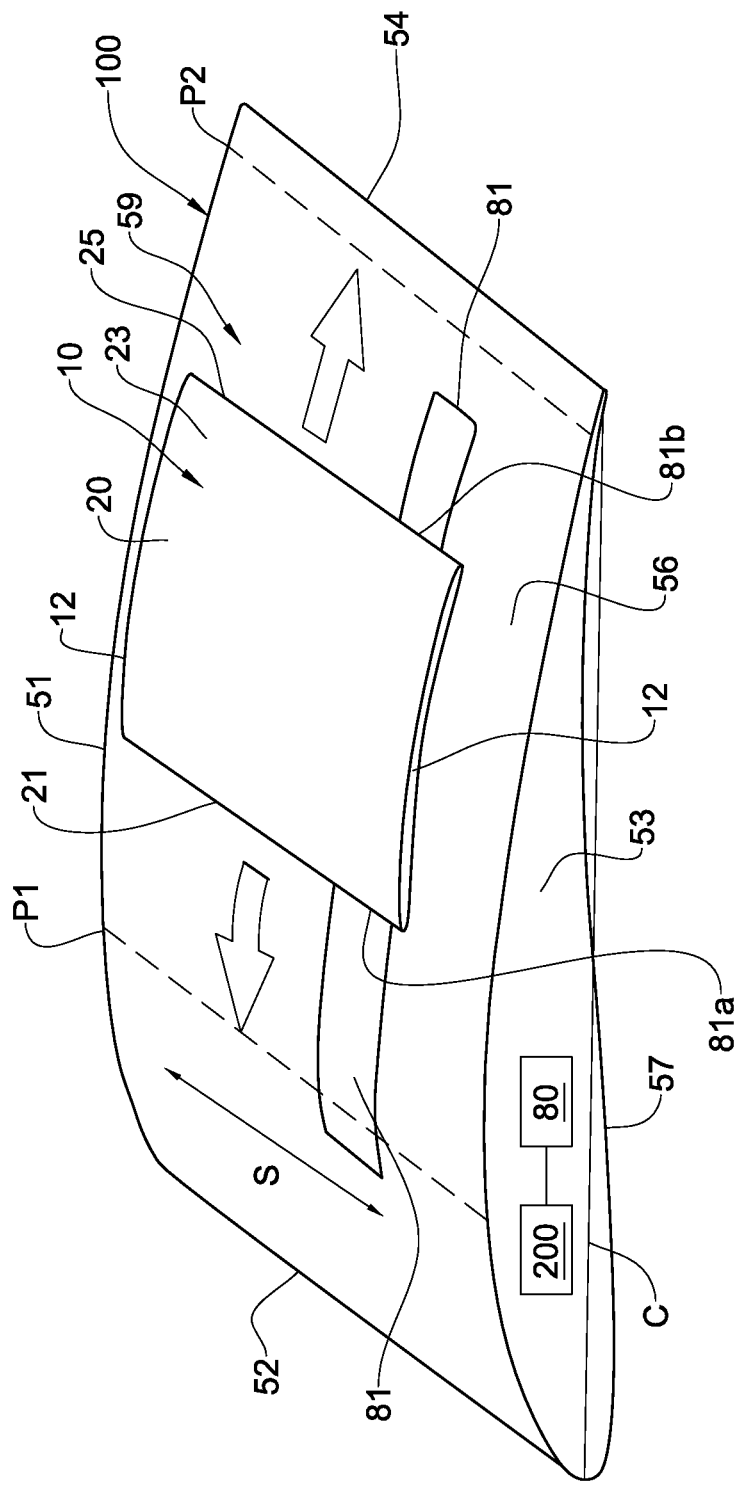
FIG. 1 is an isometric view of an example of a wing element comprising an example of a profile modifying device movably mounted thereto.

According to an aspect of the presently disclosed subject matter, and referring to FIG. 1, an example of an aerofoil device (also interchangeably referred to herein as a device, as a profile modifying device, or as an aerofoil profile modifying device), generally designated 10, is provided for an aircraft wing, in particular of a fixed wing aircraft.

The device 10 is a configured for selectively providing a modified aerodynamic flow over a wing, on which it is movably mounted, under at least one set of aerodynamic flight conditions as compared with a respective datum aerodynamic flow over an external wing surface of the wing in the absence of such a device under the same set of aerodynamic flight conditions.

For the purpose of example, such an aircraft is described herein as a fixed-wing aircraft, comprising a regular subsonic/transonic configuration, having a fuselage section, main wings, empennage (e.g., tailplane, vertical stabilizer), and a propulsion system, but may instead include, mutatis mutandis, any other type of aircraft, for example: rotor-wing aircraft including helicopters; gliders; subsonic/transonic aircraft having canards rather than a tailplane; general aviation aircraft, cruise missiles or other air-delivered ordinance, and so on.

Referring again to FIG. 1, and by way of non-limiting example, a wing element 100 of a wing is illustrated, the wing having for example a substantially rectangular plan shape. The wing element 100 can comprise a portion of the span of the main lift-generating wing, or the full span of the wing (port or starboard), of the aircraft. In at least some other examples, the wing element can comprise part or all of a control surface of an air vehicle, for example fin, canard, stabilizer etc.

The leading edge 52 of the wing element 100 is substantially rectilinear and has a substantially zero sweep angle. The wing element 100 is illustrated having a taper of about 1.0, between the two lateral ends thereof, referred to as the root 51 and the tip 53. The trailing edge 54 of the wing element 100 is also substantially rectilinear and comprises a substantially zero sweep angle. In alternative variations of this example, the wing element 100 may have a different plan form, for example: swept-back or swept forward, and/or with a different taper ratio (along the full wing, or different taper ratios for different wing elements); and/or having a different plan form, including curved leading edges and/or trailing edges such as an elliptical form, for example; and/or at least some portion of the wing may have a positive, negative or zero dihedral angle; and so on.

Referring also to FIG. 2a, the wing element 100 is based on an example of a datum single-element aerofoil 300, and comprises: chord C; aerofoil leading edge 38, which coincides with the leading edge 52 of the wing element 100; aerofoil trailing edge 39, which coincides with the trailing edge 54 of the wing 10; an external aerofoil surface 39 comprising aerofoil suction surface 31 and aerofoil pressure surface 33, respectively coinciding with external wing surface 59, suction surface 56 and pressure surface 57 of the wing element 100. FIG. 2b provides coordinates of the aerofoil 300.

External surface 59 is a surface of the wing element that is exposed to an airflow, in particular an aerodynamic flow, in particular during aerodynamic flight.

By way of non-limiting example, the datum aerofoil 300 comprises a thickness ratio in the range between about 10% and about 18%, and has a design Reynolds number ($Re_{design}$) in the range between about $1.0*10^5$ to about $1.0*10^6$, in particular in the range $1.0*10^5$ to $7.0*10^5$. In at least some examples of the device, the $Re_{design}$ for the aerofoil 300 may be greater than $1.0*10^6$, and/or, the thickness ratio may be less than about 10% or greater than about 18%.

Device 10 comprises a body 20 configured to be movably mounted to the wing element 100 for selective displacement between at least two different positions P1 and P2 with respect to said external wing surface 59. For the sake of simplicity, such positions P1, P2 and any other position of the body 20 with respect to said external wing surface 59, is referred to herein generically as position P.

In particular the body 20 is configured for translating over part or all of the outer skin of the wing element 20 between at least two positions P.

Referring also to FIGS. 3a and 3b, the body 20 comprises an external body surface 23, extending in a general chordwise direction between a first edge 21 and second edge 25 of the body 20.

External body surface 23 is a surface of the body 20 that is exposed to an airflow, in particular an aerodynamic flow, in particular during aerodynamic flight.

The body 20 can extend laterally (i.e. along a general spanwise direction S) the along the full span of the wing element 100, or alternatively part thereof. In the illustrated example of FIG. 1, the body 20 extends along spanwise direction S from close to root 51 of the wing element 100 (closest to the aircraft fuselage) to an intermediate point between the root 51 and the tip 53 (furthest from the aircraft fuselage) thereof, and also comprises lateral sides 12.

In operation, the body 20 is configured for compelling the modified aerodynamic flow over the wing to be directed over the external body surface 23 while concurrently preventing the modified aerodynamic flow over the wing to be directed over the respective wing surface portion 55 that is superposed by said body 20. Such a modified aerodynamic flow can exclude an airflow over the respective wing surface portion 55; alternatively, in some examples the body 20 can be ventilated and thus some of the modified aerodynamic flow can flow through the body 20. The external body surface 23 is configured for being exposed to the airflow in operation of the device 10.

In at least some examples of the device 10, the body 20 is configured for selective displacement with respect to the external wing surface 59 via sliding displacement between the body 23 and the external wing surface 59. Additionally or alternatively, this displacement is along a direction generally tangential to the wing external surface 59.

The external body surface 23 is outwardly facing with respect to the external wing surface 59, and the body 20 has an effective thickness t that increases from a first minimum thickness $t_{01}$, typically nominally zero or close thereto, at first edge 21 to a maximum thickness $t_{MAX}$ at an intermediate position along the axial length of the body 20 (taken to be generally parallel to the chord C), and decreases again to a second minimum thickness $t_{02}$, also typically nominally zero or close thereto, at second edge 25, as illustrated in FIG. 2c, for example. For example, the ratios $t_{MAX}$:$t_{02}$ and $t_{MAX}$:$t_{02}$ may each be in the range 2 to 100.

The body 20 has a wing interface 27, via which in use of the device 10 the body 20, and particularly the external body surface 23, assumes a superposed relationship with a respective portion 55 of external wing surface 59 at each respective position P thereon. In this example, the wing interface 27 is in the form of a contact surface 29 that is in selective abutting contact with the respective portion 55 of external wing surface 59 at the respective position P thereon. The body 20 is, in this example, flexible in at least a general chordwise direction, and thus allows the wing interface 27 to conform to the curvature of the external wing surface 59 at each respective position P thereon, even where there are significant differences in surface curvature between the different positions P.

Figure 4A:
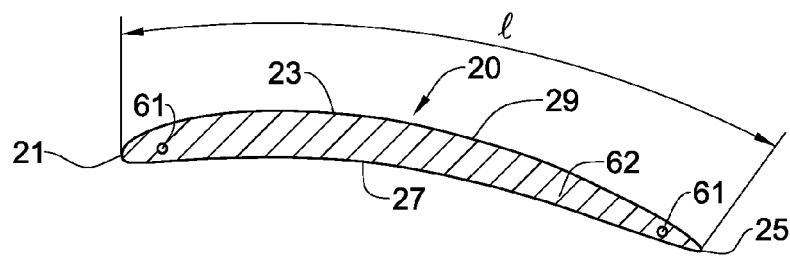
FIGS. 4a to 4f are side views of alternative profile modifying device examples.

In this example, and as illustrated in FIG. 4(a) the body 20 is of solid construction and made from a relative flexible material 62, such as for example silicone or rubber. Optionally at least the first edge 21 and/or the second edge 25 may be mechanically reinforced, for example using internal metal bars 61, and/or the first edge 21 and/or the second edge 25 may be made from a rigid or durable material, for example a suitable metal or hard plastic.

Figure 4B:
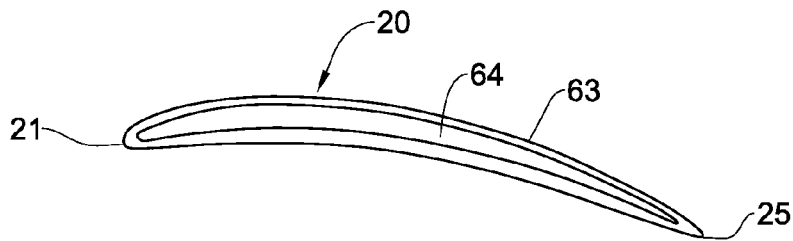

In an alternative variation of this example, and referring to FIG. 4(b), the body 20 can have a continuous flexible skin 63 enclosing an internal volume 64 that may be filled with any suitable medium, for example a suitable fluid medium, or any suitable semi fluid medium, or any suitable viscous medium, that on the one hand maintains the form of the external body surface 23, particularly under the aforesaid aerodynamic flight conditions, and on the other hand allows for changes in the cross-sectional geometry of the body 20 as a result of the respective wing interface 27 changing shape between different positions P to conform to the respective curvature of the external wing surface 59 at each position P. For example, the medium may comprise a suitable liquid, or a suitable gel, or a suitable gas (for example a pressurized gas having a greater pressure than the external ambient air), or a suitable solid (for example in the form of a granulated or powdered substance, for example polystyrene balls of sufficiently small diameter to flow over one another relatively freely within internal volume 64).

Figure 4C:
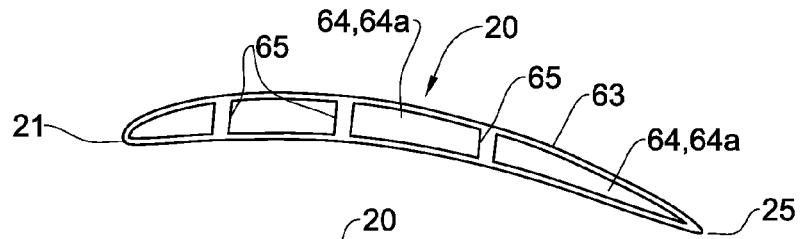

In another alternative variation of this example, and referring to FIG. 4(c), the body 20 may have a continuous flexible skin 63 enclosing an internal volume 64, and internal ribs 65 dividing the internal volume 64 into a number of compartments 64a that may be sealed from one another, or in fluid communication with one another.

Figure 4D:
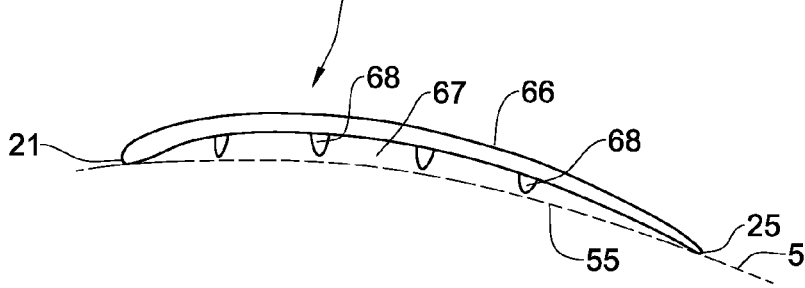
Figure 4E:
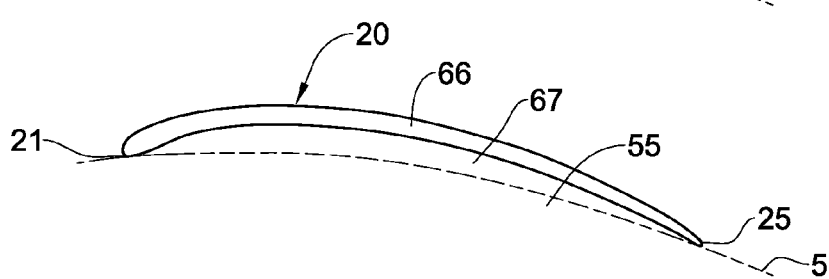

In other alternative variations of this example, and referring to FIG. 4(d) and to FIG. 4(e), the body 20 comprises a sheet-like skin 66 comprising external body surface 23, and forms a cavity 67 with the respective portion 55 of external wing surface 59 at the respective position P, so that the first edge 21 and the second edge 25 form the wing interface 27. In the example illustrated in FIG. 4(d) support ribs 68 are provided on the inside surface of skin 66 and which may optionally extend to abutting contact with the respective portion 55 of external wing surface 59 at least at one respective position P. In such cases the thickness of the corresponding body 20 at any location thereof may be considered, for example, as the spacing between the external body surface 23 and the respective portion 55 of external wing surface 59 at that location, in a direction perpendicular to the respective portion 55 thereat.

Figure 4F:
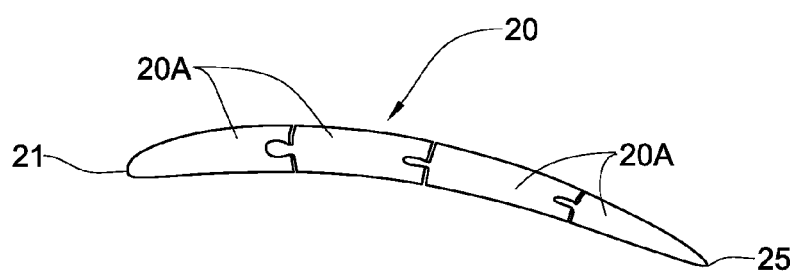

In yet another alternative variation of this example, and referring to FIG. 4(f), the body 20 may comprise two or more articulated body segments 20A (for example four articulated body segments 20A, as illustrated in FIG. 4(f)), which in this manner enables the respective wing interface 27 to fully or partially conform to the respective curvature of the external wing surface 59 at each position P. In this example the body segments 20A are articulated via joints having respective pivoting axes in the general spanwise direction. For example, the joints may be integral with the segments 20A, the joints formed, for example, as film hinges between adjacent segments 20A.

In the illustrated example of FIG. 4a, and the variations thereof illustrated in FIGS. 4b to 4f, the thickness distribution of the respective body 20 as a function of distance along the external body surface 23 between the first edge 21 and the second edge 25, for example in a peripheral direction on the external body surface 23 orthogonal to at least one of the first edge 21 and the second edge 25 (for example on a plane parallel to that of aerofoil 300), may remain constant independent of the position P of the device 10 with respect to the external wing surface 59. However, in alternative variations of these examples, such a thickness distribution may change with position P. For example, the respective body 20 may be configured to morph to different shapes at each position P, using any suitable morphing system, for example: via inflation/deflation of the body 20 and/or using internal actuators as appropriate.

Figure 7A:
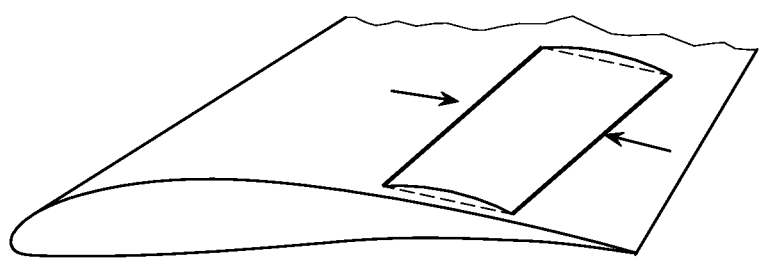
FIGS. 7a and 7b are isometric views of an example of a wing element comprising an example of a profile modifying device movably mounted thereto in different length/thickness configurations.
Figure 7B:
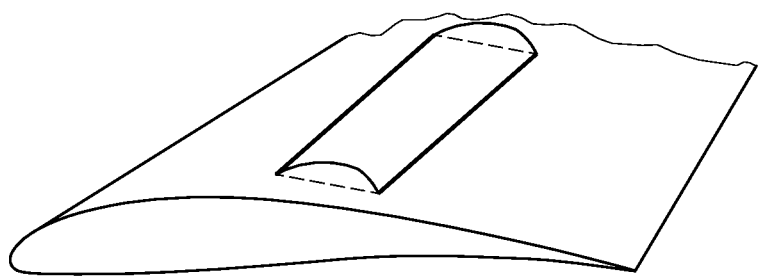

For example, the device 10 may be configured for moving the first edge 21 and the second edge 25 over external wing surface 59, independently from one another (within limits defined by the physical characteristics of the body 20, for example), and thus at any position P, the body 20 may be relatively shallow (low maximum thickness) but long (FIG. 7a), or relatively thicker but shorter (FIG. 7b). In at least such an example the body 20 may be formed as a relatively thin plate made from any suitable flexible material, for example fiberglass, optionally including a suitable thermal memory material integrated into the fiberglass plate, for example.

In the illustrated example in FIG. 4a, and variations thereof illustrated in FIGS. 4b to 4f, the length l of the respective body 20 along the external body surface 23 between the first edge 21 and the second edge 25, for example in a peripheral direction on the external body surface 23 orthogonal to at least one of the first edge 21 and the second edge 25 (for example on a plane parallel to that of aerofoil 300), may remain constant independent of the position P of the device 10 with respect to the external wing surface 59. However, in alternative variations of these examples, such a length l may change with position P. For example, the respective body 20 may be configured to stretch/contract to different lengths l at each position P, using any suitable dimensional changing system, for example: via inflation/deflation of the body 20 and/or using internal actuators as appropriate, and/or by configuring the respective body 20 to comprise at least partially telescoping segments.

In yet other variations of the example of FIGS. 4a to 4f, 7a, 7b, the curvature of part of the external wing surface 59 between P1 and P2 is generally constant, and thus the respective body 20, or at least the respective wing interface 27, can be relatively rigid and thus maintains a constant shape regardless of the actual position P between P1 and P2.

In the illustrated example in FIG. 4a, and at least in some variations thereof for example as illustrated in FIGS. 4b to 4f, for example, the respective body 20 has a constant cross-sectional shape and size along a spanwise direction S, and the first edge 21 and the second edge 25 are each rectilinear and are respectively parallel to the leading edge 52 and the trailing edge 54 of the wing element 100. However, in alternative variations of these examples, the cross-sectional shape and/or size of the respective body 20 may vary along spanwise direction S, and/or, the first edge 21 and/or the second edge 25 may be non-rectilinear and/or non-parallel to the leading edge 52 and the trailing edge 54, respectively, of the wing element 100.

Device 10 further comprises a motion inducing arrangement 80 coupled to body 20 and configured for providing the aforesaid selective displacement between positions P1 and P2 with respect to said external wing surface 59. Examples of the motion inducing arrangement 80 are described further below, and in at least these examples the inducing arrangement 80 is also coupled or mounted to wing element 100.

In the illustrated example in FIG. 4a, and at least in some variations thereof for example as illustrated in FIGS. 4b to 4f, 7a, 7b, the respective body 20 can be selectively displaced to any desired positions between P1 and P2, on the suction surface 56, and thus the motion inducing arrangement 80 is configured for providing continuous displacement between P1 and P2, and for selectively anchoring the body 20 at any desired position therebetween. In alternative variations of this example the body 20 can be selectively positioned in (and moved between) two or more discrete desired positions including P1 and P2, and thus the respective motion inducing arrangement 80 is configured for providing such displacements, and for selectively anchoring the body 20 only at such positions.

Each position P can be chosen, together with a particular thickness distribution and length l for the respective body 20, such as to provide a desired aerodynamic flow over the wing element 100—body 20 combination under at least one set of aerodynamic flight conditions as compared with a respective datum aerodynamic flow over an external wing surface of the wing element 100 in the absence of the body 20 under the same set of aerodynamic flight conditions.

At each position P, an effective hybrid surface H can be defined for the wing element 100—body 20 combination, including exposed parts of external wing surface 59, and further including the external body surface 23 rather than the respective portion 55 of external wing surface 59. The aerodynamic flow over the wing element 100—body 20 combination is thus over hybrid surface H, while in the absence of the body 20 the aerodynamic flow over the wing element 100 is over external wing surface 59.

For example, each position P may be defined as the chord-wise location of a particular part 29 of the body 20 from the leading edge 52, as a percentage of the chord C. Such a part 29 may be, for example, the center of the body 20, more precisely the mid point along the external body surface 23 between the first edge 21 and the second edge 25, for example 50% along length l in a peripheral direction on the external body surface 23 orthogonal to at least one of the first edge 21 and the second edge 25 (for example on a plane parallel to that of aerofoil 300). Of course each respective position P may be defined in a different manner with respect to the body 20 and/or with respect to the wing element 100. For example, and referring to FIGS. 5a to 5d, a position P can be expressed instead as distance n of part 29 (or of first edge 21 or of second edge 25, for example) along the external wing surface 59 from a particular point thereon (for example leading edge 52).

Positioning the body 20 at each of various positions P can have different effects on performance and thus on the flight envelope, including one or more of the following, described in more detail below: wing drag reduction; mild stall; drag increase; increased lift; pressure surface effects.

Wing Drag Reduction

Figure 17:
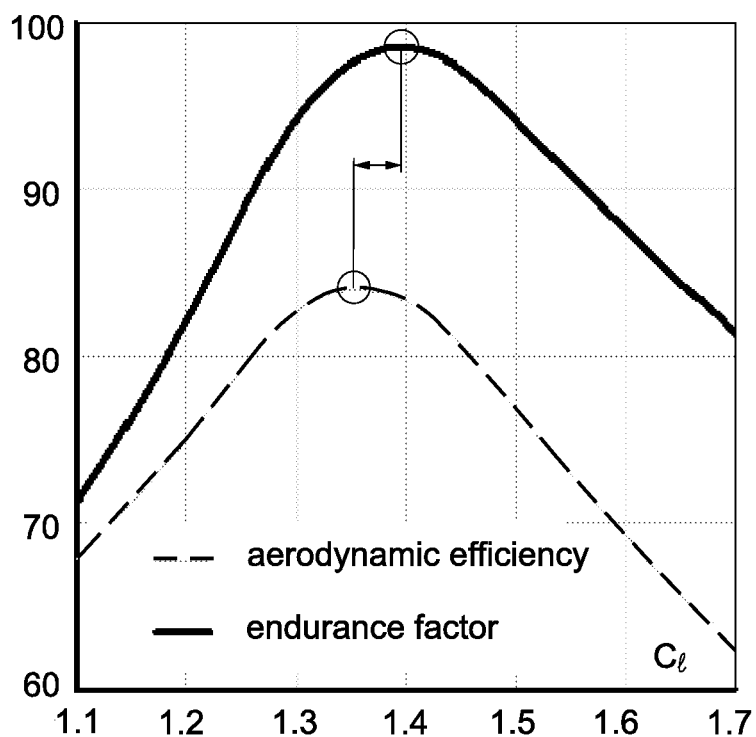
FIG. 17 illustrates an example of the variation of endurance factor and of aerodynamic efficiency of an aerofoil example as a function of lift coefficient.

Drag reduction optimization at different points in the flight envelope of an air vehicle requires corresponding wing geometry optimization at each such point, and in many flight envelopes long endurance and long range (a function of aerodynamic efficiency~lift/drag ratio) are maximized at different points in the flight envelope, particularly at different values of lift coefficients (see FIG. 17).

Figure 16:
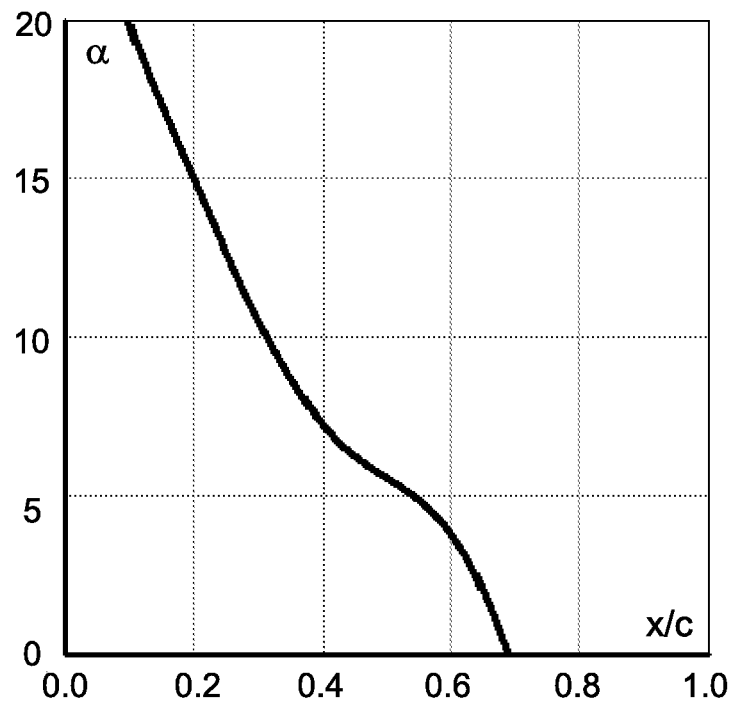
FIG. 16 illustrates an example of the variation of the position of the laminar-turbulent transition line on an aerofoil surface example as a function of angle of attack.

Under at least some flight conditions (in particular of at least partial laminar flow over the wing, at low Reynolds numbers), a contributor to wing drag is the drag generated by the laminar separation bubble, which can be reduced by decreasing the size of the separation bubble size. The position of the separation bubble over the suction surface of a wing changes according to the position of the laminar-turbulent transition line on the aerofoil surface, which depends on the angle of attack and the aerodynamics conditions of the flow—see for example FIG. 16. Conventional aerofoil design, with a relatively or absolutely fixed geometry, allows maximum reduction of separation bubble drag at a single design point, typically for long endurance flight for operational UAV's, and such conventional aerofoil design cannot also provide maximum separation bubble drag reduction at other flight points. According to an aspect of the presently disclosed subject matter, the body 20 can be positioned at a position P on the suction surface at a particular set of aerodynamic conditions to reduce separation bubble size at these conditions. Furthermore, the body 20 may be displaced to different positions P on the suction surface, at the same set of aerodynamic conditions or at different respective sets of aerodynamic conditions, following the movement of the laminar-turbulent transition line, which thus allows for optimizing or maximizing reduction of separation bubble drag for a wide range of angle of attack, and which in turn enables optimization of aerodynamic characteristics for both maximum endurance and maximum aerodynamic efficiency. While displacing the body 20 in this manner is of particular effect in reducing separation bubble drag for low Reynolds number flight, it also has benefits at higher Reynolds numbers, even in conditions where the separation bubble size can be small and does not provide a significant contribution to the overall drag.

By way of non-limiting example, the datum aerofoil 300 has a design Reynolds number ($Re_{design}$) in the range between about $1.0*10^5$ to about $1.0*10^6$, in particular in the range $1.0*10^5$ to $7.0*10^5$. At $Re_{design}$, greater than $7.0*10^5$, and in particular greater than to $1.0*10^6$, the size of the separation bubble diminishes rapidly, and contribution of the associated drag to the overall drag is rapidly reduced.

Figure 5A:
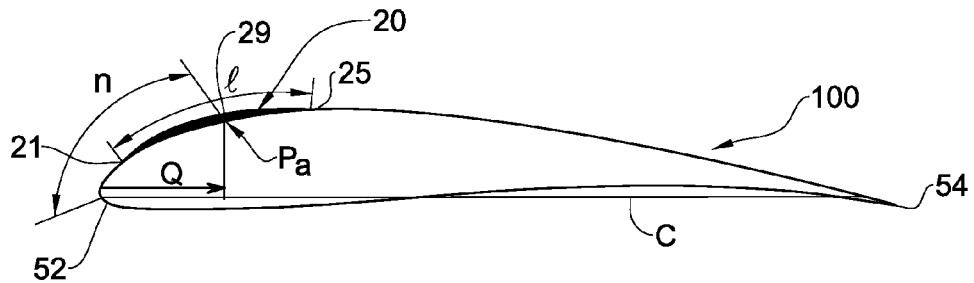
FIGS. 5a to 5d are side views of alternative positions of a profile modifying device example on the suction surface of the wing element example of FIG. 1.
Figure 5B:
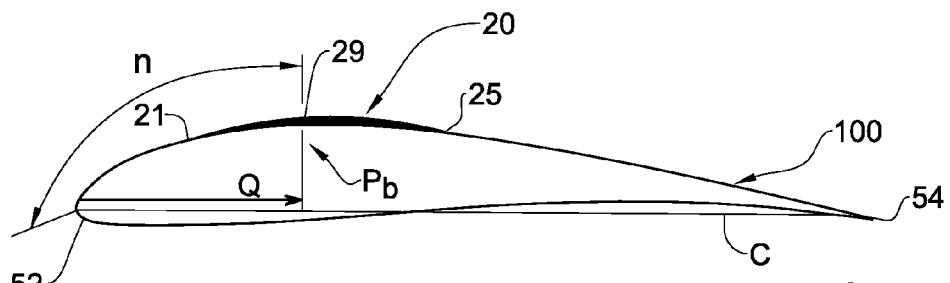
Figure 5C:
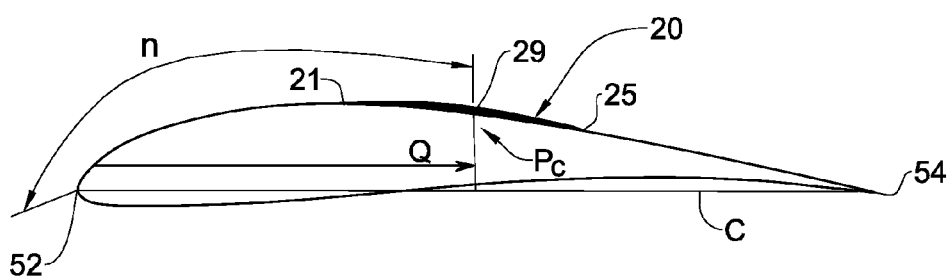

For example, and referring to FIG. 5c, in one such position P (referred to herein specifically as $P_c$), part 29 of the body 20 can be between about 10% and about 70%, fore example at about 50% chord from the leading edge 52 of the wing element 100 on the suction surface 56, and such a wing element 100—body 20 combination can provide a modified aerodynamic flow (under at least one set of aerodynamic flight conditions) in which the airflow is over the corresponding hybrid surface H including external body surface 23 rather than the respective portion 55 of external wing surface 59 at this respective position P. Such an arrangement can provide drag reduction, for example, as compared with the wing element 100 in the absence of body 20 under the same set of aerodynamic flight conditions. FIG. 6a provides coordinates of the hybrid surface H of the example of FIG. 5c taken along a plane parallel to that of aerofoil 300, and this profile can be compared with the profile of aerofoil 300 (the coordinates of which are provided in FIG. 2b) and/or to the coordinates of a cross-section of the body 20 at this position P (see FIG. 6b), also taken along a plane parallel to that of aerofoil 300.

In particular, the body 20 can be positioned at a position P at the location of a separation bubble that may form on the wing element 100 at particular aerodynamic flight conditions, for example at low Reynolds numbers.

Figure 12:
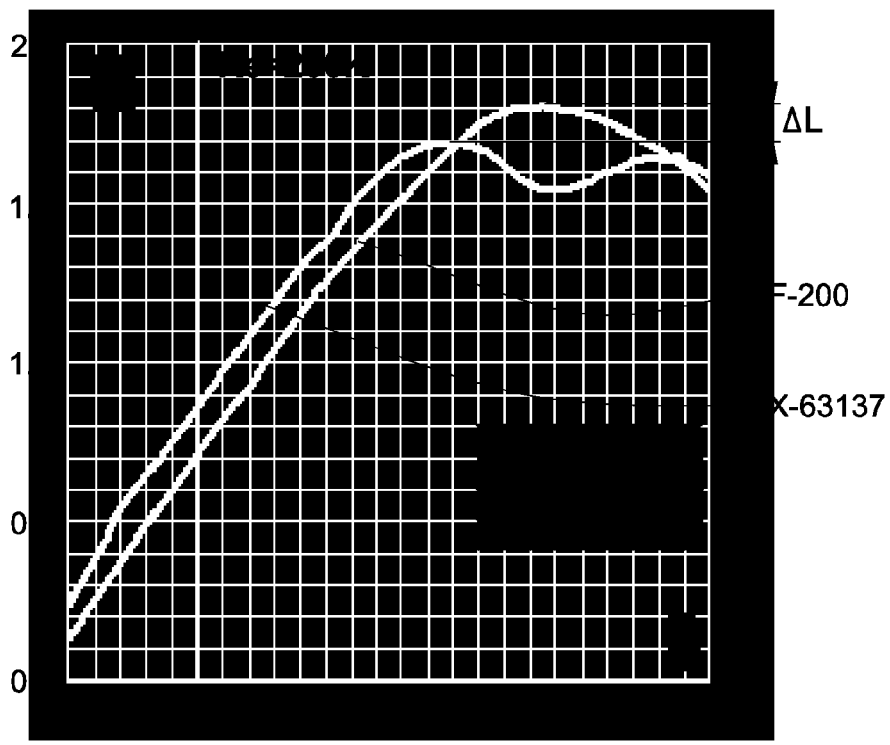
FIG. 12 compares the lift coefficient vs. angle of attack characteristics between one example of a datum aerofoil and one example of a modified aerofoil comprising a profile modifying device movably mounted thereto.

FIG. 12 compares the lift coefficient vs. angle of attack characteristics between a specific example of a well-known datum aerofoil (this example being the Wortmann's aerofoil FX-63137) and an example of a modified aerofoil, designated aerofoil F-200 which has a modified aerofoil profile due to a body 20 (based on the coordinates provided in FIG. 6b) at a position P for optimal endurance, at about 35% or 40% from the leading edge. As may be seen, the profile for aerofoil example F-200 provides lift coefficient vs. angle of attack characteristics that favorably compare with those of aerofoil FX-63137, and in fact provide a better maximum lift coefficient.

Figure 5D:
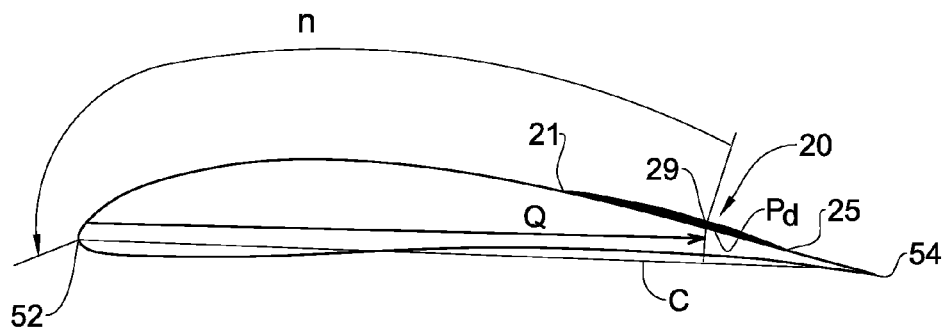

For example, and referring to FIG. 5d, in another such position P (referred to herein specifically as $P_d$) on the suction surface 56, part 29 of the body 20 can be at a position greater than 50% chord from the leading edge 52 of the wing element 100, for example between about 60% and about 80% depending on length l for example, and such a wing element 100—body 20 combination can provide a different modified aerodynamic flow (under at least one set of aerodynamic flight conditions) in which the airflow is over hybrid surface H, including the external body surface 23 rather than the respective portion 55 of external wing surface 59 at this respective position P. Such arrangements can also provide drag reduction, for example, as compared with the wing element 100 in the absence of body 20 under the same set of aerodynamic flight conditions. FIGS. 6c and 6d provide, respectively, coordinates of the hybrid surface H of the example of FIG. 5d (where part 29 is at 60% and 70%, respectively, of the chord) taken along a plane parallel to that of aerofoil 300, and these can be compared with the profile of aerofoil 300 (see FIG. 2b) in the absence of body 20.

Figure 13:
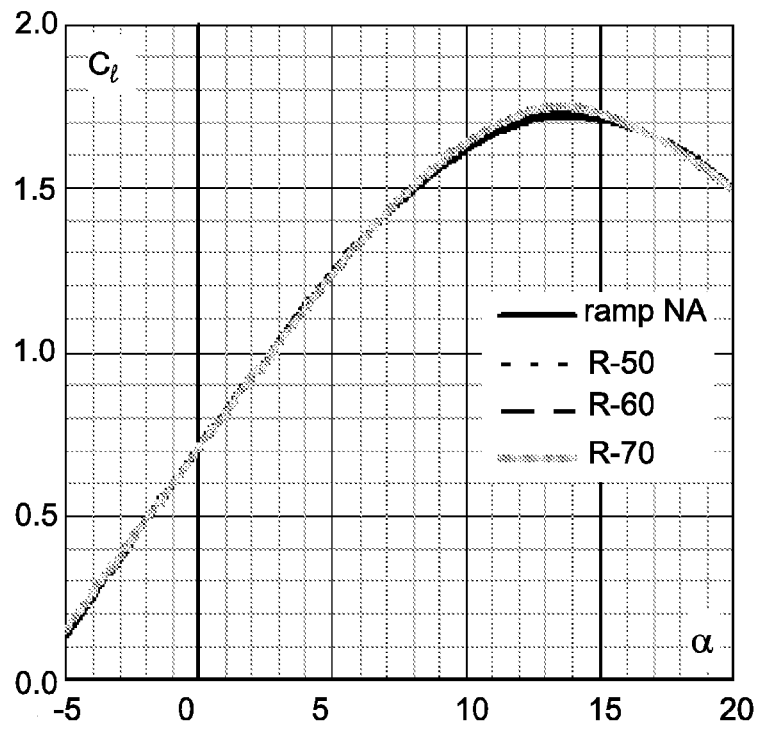
FIG. 13 compares the lift coefficient vs. angle of attack characteristics obtained with the datum aerofoil of FIG. 2b and with three modified aerofoil profiles corresponding to FIGS. 6a, 6c and 6d.
Figure 14:
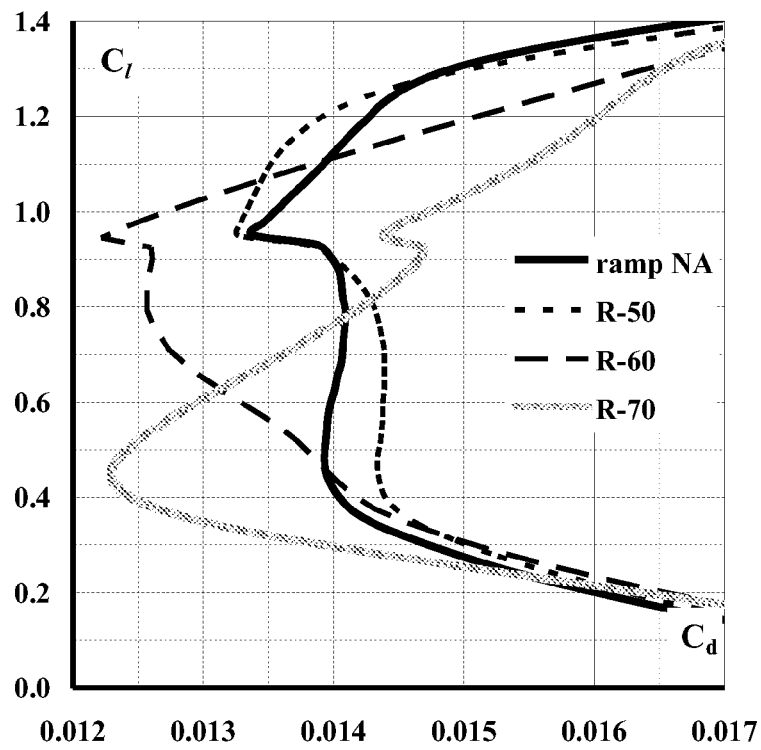
FIG. 14 compares the lift coefficient vs. drag coefficient characteristics obtained with the datum aerofoil of FIG. 2b and with three modified aerofoil profiles corresponding to FIGS. 6a, 6c and 6d, at free transition laminar-turbulent conditions.
Figure 15:
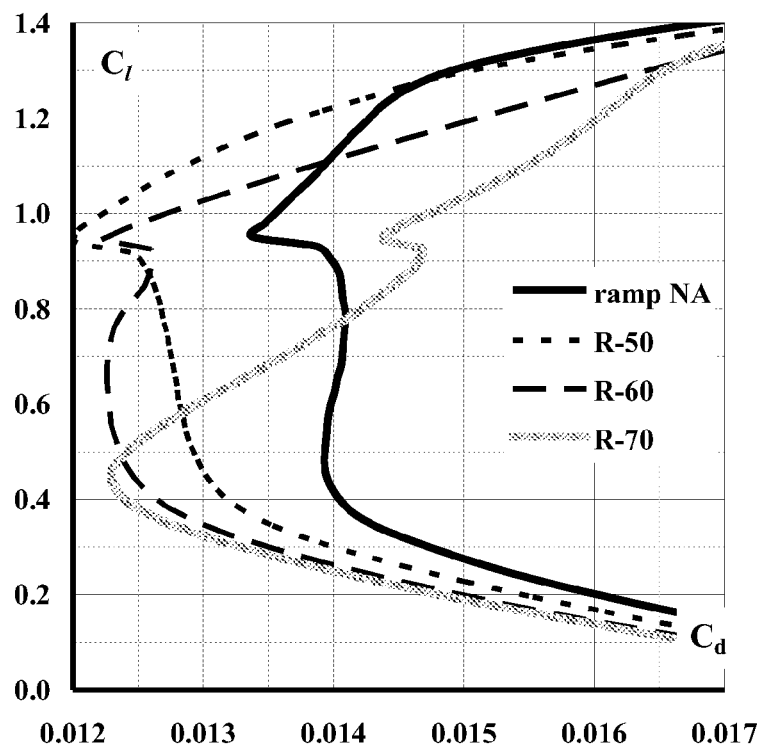
FIG. 15 compares the lift coefficient vs. drag coefficient characteristics obtained with the datum aerofoil of FIG. 2b and with three modified aerofoil profiles corresponding to FIGS. 6a, 6c and 6d, at forced transition conditions.

FIG. 13 compares the lift coefficient vs. angle of attack characteristics between the datum aerofoil of FIG. 2b (designated "ramp NA" in FIGS. 13 to 15) and three modified aerofoil profiles based on the datum aerofoil but having body 20 at positions P at 50%, 60% and 70% from the leading edge (designated "R-50", "R-60", "R-70", respectively, in FIGS. 13 to 15), corresponding to the aerofoils the coordinates of which are provided in FIGS. 6a, 6c and 6d, respectively. As may be seen, providing the body 20 at these positions P does not greatly affect the lift coefficient characteristics of the datum aerofoil. On the other hand, FIG. 14 compares the lift coefficient vs. drag coefficient characteristics between the datum aerofoil of FIG. 2b and the three modified aerofoil profiles based on the datum aerofoil but having body 20 at positions P at 50%, 60% and 70% from the leading edge, corresponding to the aerofoils of FIGS. 6a, 6c and 6d, respectively, at free transition laminar-turbulent conditions. As may be seen from FIG. 14, for any particular lift coefficient, the position of the body 20 on the suction surface greatly affects the corresponding drag coefficient. FIG. 15 corresponds to FIG. 14, but rather than free transition conditions, FIG. 15 provides the comparison of lift coefficient vs. drag coefficient characteristics at forced transition provided by the body 20, for example at the first edge thereof. As may be seen from FIG. 15, for any particular lift coefficient, the position of the body 20 on the suction surface affects the corresponding drag coefficient even more than in conditions of free transition.

Figure 18:
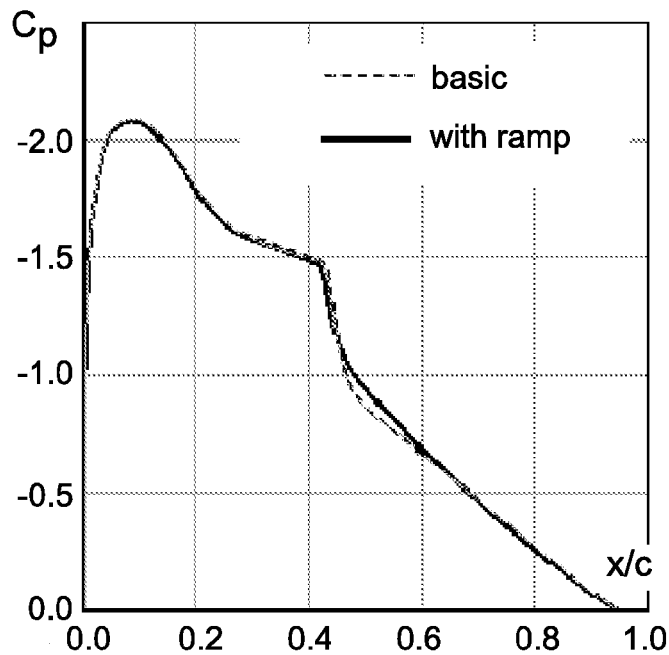
FIG. 18 compares the pressure coefficient distributions obtained with the datum aerofoil of FIG. 2b and with a modified aerofoil profile (F-200) corresponding the datum profile modified with an example of a profile modifying device mounted thereon at a position corresponding to the laminar-turbulent transition line.
Figure 19:
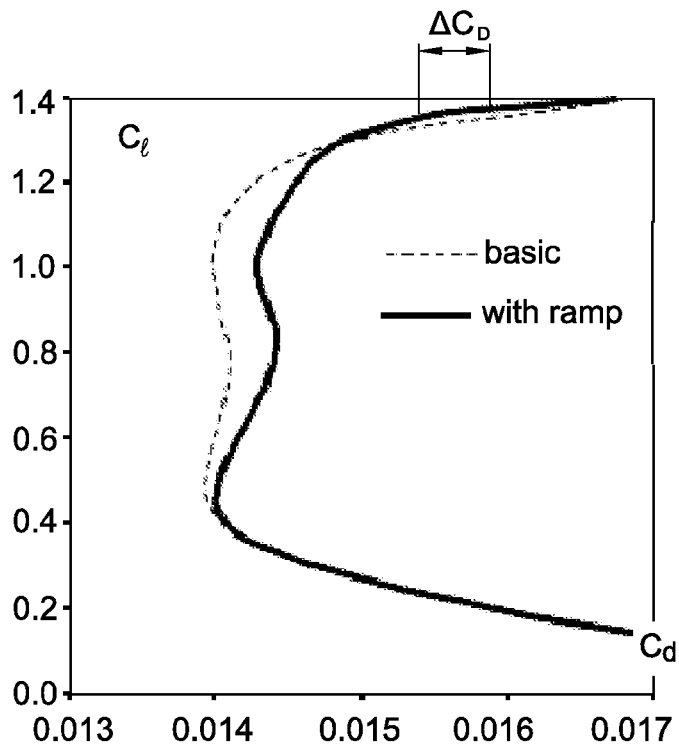
FIG. 19 compares the lift coefficient vs. drag coefficient characteristics obtained with the datum aerofoil of FIG. 2b and with a modified aerofoil profile (F-200) corresponding the datum profile modified with an example of a profile modifying device mounted thereon at a position corresponding to the laminar-turbulent transition line.

FIG. 18 compares the pressure coefficient distribution obtained with the aforesaid aerofoil F-200, with the pressure distribution obtained with the datum aerofoil 300, i.e., having a profile corresponding to that of aerofoil F-200, but with the profile of the body 20 removed therefrom, i.e., corresponding to the coordinates provided in FIG. 2b. FIG. 19 provides a comparison of lift coefficient vs. drag coefficient characteristics of these two aerofoils, and shows a drag coefficient reduction for the F-200 aerofoil for lift coefficients higher than about 1.3.

Mild Stall

In at least some examples, displacement of the body 20 to an aft position P on the suction surface 56 can delay trailing edge separation and improve stall characteristics. Such a modification to the suction surface profile of the aerofoil is also referred to a "mild stall ramp", for example as disclosed in US 2007/278354, assigned to the present Assignee and the contents of which are incorporated herein in their entirety.

For example, and referring to FIG. 5d, in another such position P such as for example the aforesaid position $P_d$ on the suction surface 56, in which part 29 of the body 20 is at a position greater than 50% chord from the leading edge 52 of the wing element 100, for example between about 60% and about 80% depending on length l for example. Such a wing element 100—body 20 combination can provide a different modified aerodynamic flow (under at least one set of aerodynamic flight conditions) in which the airflow is over hybrid surface H, including the external body surface 23 rather than the respective portion 55 of external wing surface 59 at this respective position P. Such an arrangement can provide mild stall characteristics for the wing element 100—body 20 combination, for example, as compared with the wing element 100 in the absence of body 20 under the same set of aerodynamic flight conditions, for at least some aerodynamic flight conditions. For example, FIGS. 6c and 6d respectively provide coordinates of the hybrid surface H of the example of FIG. 5d (where part 29 is at 60% and 70%, respectively, of the chord) taken along a plane parallel to that of aerofoil 300, and these can be compared with the profile of aerofoil 300 (see FIG. 2b) in the absence of body 20. Mild stall characteristics can provide reduced speed safety margins and provide loitering flight at lift levels close to maximum lift values.

Drag Increase

There are some points in the flight envelope where an increase in drag may be desired. For example, for pre-stall and stall angles of attack, the body 20 can be displaced to a forward position on the suction surface 56 to thereby increase local thickness and thereby generate a drag increment relative to the wing element 100 in the absence of the body 20. Such a feature can be useful for take-off glide angle, for example.

For example, and referring to FIG. 5b, in another such position P (referred to herein specifically as $P_b$), part 29 of the body 20 can be on the suction surface 56 at less than 50% chord from the leading edge 52 of the wing element 100, for example between about 20% and about 35% depending on length l for example and such a wing element 100—body 20 combination can provide a different modified aerodynamic flow (under at least one set of aerodynamic flight conditions) in which part of the airflow is over the external body surface 23 rather than the respective portion 55 of external wing surface 59 at this respective position P. Such an arrangement can provide drag increment, for example, as compared with the wing element 100 in the absence of body 20 under the same set of aerodynamic flight conditions.

Increased Lift

The body 20 can be displaced to an even more forward position on the suction surface 56 close to the leading edge, decreasing the local curvature (i.e., effectively increasing the leading edge radius), thereby delaying suction peak development and maximizing lift increment relative to the wing element 100 in the absence of the body 20.

For example, and referring to FIG. 5a, in another such position P (referred to herein specifically as $P_a$), part 29 of the body 20 can be at less than 30% chord from the leading edge 52 of the wing element 100, for example between about 5% and about 15% depending on length l for example and such a wing element 100—body 20 combination can provide a different modified aerodynamic flow (under at least one set of aerodynamic flight conditions) in which the airflow is over the hybrid surface H, including external body surface 23 rather than the respective portion 55 of external wing surface 59 at this respective position P. Such an arrangement can provide increased maximum lift for the wing element 100—body 20 combination, for example, as compared with the wing element 100 in the absence of body 20 under the same set of aerodynamic flight conditions.

Pressure Surface Effects

Figure 8A:
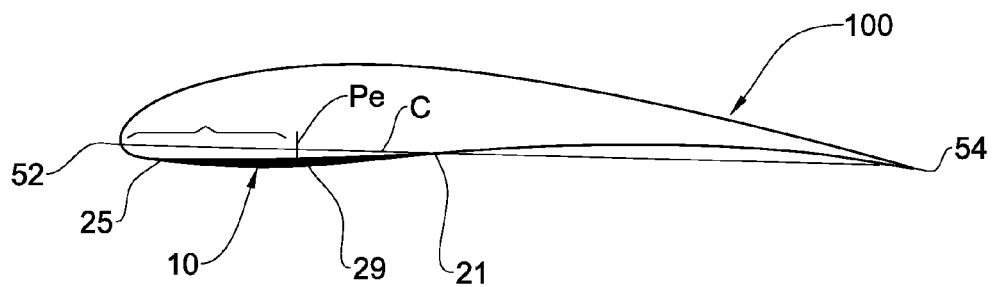
FIGS. 8a to 8b are side views of alternative positions of a profile modifying device example on the pressure surface of the wing element example of FIG. 1.
Figure 8B:
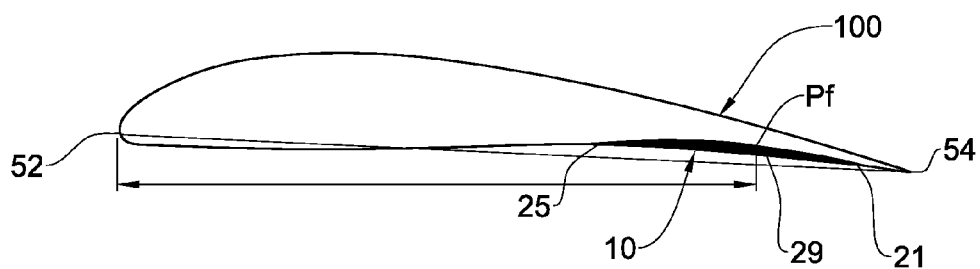

In the examples illustrated in FIGS. 8a and 8b, the device 10, and in particular the body 20, is configured for being displaced to at least two positions P on the pressure surface 57 of the wing element 100. Alternatively, the device 10 may be configured for enabling the body 20 to be displaced between at least one position P on the suction surface 56 and at least one position P on pressure surface 57.

A wing designed for high speed flight, conventionally does not require large leading edge radius or large camber with respect to the pressure surface, while at low speed, maximum lift flight large leading edge radius and/or large camber close to the leading edge can be useful. The body 20 can be positioned on the pressure surface 57 close to the leading edge 52 for low lift, maximum speed flight, thereby decreasing curvature and effectively increasing leading edge radius and/or camber), and moved to a position in the aft direction for high lift flight. At relatively high angles of attack the stagnation point on the leading edge can move to the pressure surface, and in at least some examples of the device 10 providing large leading edge radius and/or large camber close to the leading edge via the body 20 can prevent or minimize or at least reduce pressure peak development on the suction surface (as compared with not having the body 20 at the corresponding position on the pressure surface), and can result in reduction of the separation bubble that can be close to the leading edge for low lift conditions, thereby providing a drag reduction.

For example, and referring to FIG. 8a, in one such position P on the pressure surface 57 (referred to herein specifically as position $P_e$), part 29 of the body 20 can be in proximity to the leading edge 52 of the wing element 100, and such a wing element 100—body 20 combination can provide a modified aerodynamic flow (under at least one set of aerodynamic flight conditions) in which the airflow is over the respective hybrid surface H, including external body surface 23 rather than the respective portion 55 of external wing surface 59 at this respective position P. Such an arrangement can provide increased maximum speed characteristics, for example, as compared with the wing element 100 in the absence of body 20 under the same set of aerodynamic flight conditions.

For example, and referring to FIG. 8b, in another such position P on the pressure surface (referred to herein specifically as $P_f$), part 29 of the body 20 can be in proximity to the trailing edge 54 of the wing element 100, and such a wing element 100—body 20 combination can provide a modified aerodynamic flow (under at least one set of aerodynamic flight conditions) in which the airflow is over the respective hybrid surface H, including external body surface 23 rather than the respective portion 55 of external wing surface 59 at this respective position P. Such an arrangement can provide increased minimum drag characteristics, for example, as compared with the wing element 100 in the absence of body 20 under the same set of aerodynamic flight conditions.

In at least one variation of the above examples, the device 10 is configured for being moved between at least one position P on the suction surface 56 and at least one position P on the pressure surface 57 of the wing element 100, in particular between one or a plurality of positions P on the suction surface 56 and one or a plurality of positions P pressure surface 57 of the wing element 100.

The precise shape of the body 20, and thus the profile of the external body surface 23, required at each position P can be determined in any number of suitable ways.

For example, the profile of the datum aerofoil 300—body 20 combination may be conceived as a high-lift single-element airfoil, designed lift maximization as the primary design goal. A second design goal may be reduced drag for maximum speed (acceptable drag for low lift), and the aerofoil may have an additional requirement, for example acceptable stall characteristics. First, a datum aerofoil (without the body 20) is designed: for example, the aerofoil design Reynolds number may be about $2*10^5$ and designed for laminar free transition flow; for example the well known MSES code may be used as a design tool for designing the aerofoil profile. The datum aerofoil is designed for these conditions and without attention to stall characteristics or to drag minimization at the primary design point. Optionally, the aft portion of the suction surface (past the location of the laminar-turbulent transition line on the aerofoil surface at a particular angle of attack), may be constrained to be flat or with a constant curvature, particularly if the respective body 20 is to be configured with a fixed interface geometry. The resulting datum profile is then redesigned by modifying only part of the suction surface profile near the leading edge to optimize the aerofoil for conditions of maximum loiter, and the redesigned profile corresponds to the hybrid aerofoil profile (i.e., datum aerofoil profile modified with the body profile) corresponding to the design point i.e., optimizing for drag minimization at the primary design point. Once the hybrid aerofoil profile is determined, the profile of the external body surface 23 may be obtained by essentially geometrically subtracting the profile of the datum aerofoil that was first designed from the hybrid profile of the modified aerofoil, i.e., by removing from the hybrid profile all geometric elements common with the datum aerofoil. The remaining geometric portion then defines the profile of outer external body surface 23 of the body 20. The interface 27 of the body 20 is then defined from the geometry of the aerofoil 300 corresponding to portion 55 of external wing surface 59 at the respective position $P_d$.

The actual profile of the external body surface 23 can be, in practice, modified further and compromise between reducing separation bubble size, which is related to the primary goal of endurance, and other requirements, including, for example, sufficient thickness and length—for example for mechanical integrity and/or facilitating coupling to the motion inducing arrangement 80 and/or for facilitating surface smoothing the external body surface 23 to the exposed parts of the suction surface closed thereto.

In at least some examples of the body 20, the length thereof may be about 10% or greater of the chord C, and/or the thickness t may be greater than 0.1% of the chord C.

For example, the shape of body 20 may instead be optimized for providing mild stall characteristics when at position $P_d$ at corresponding aerodynamic flight conditions, and may constitute a mild stall ramp (MS ramp) when at position $P_d$. Thus, at position $P_d$ the external body surface 23 comprises a local curvature $(1/r_{local})$ that may increase, and/or that may remain substantially constant, i.e., the local curvature does not substantially decrease, along the general chord direction from the first edge 21, or a position downstream thereof, to the second edge 25.

The body 20 thus designed can be selectively moved to and retained at one or more of positions $P_a$, $P_b$, $P_c$, at corresponding aerodynamic flight conditions as desired to provide higher maximum lift, increased drag or reduction in drag, respectively, according to need.

Additionally or alternatively, it is also evident that the range of locations of position $P_d$ may overlap with the ranges of locations of one or more of positions $P_a$, $P_b$, $P_c$, $P_d$, for example. Thus, for example, and referring also to FIG. 16, the body 20 thus designed can be selectively moved to and retained at one or more of positions $P_a$, $P_b$, $P_c$, $P_d$, including locations of position P between about 10% and about 70% of the chord from the leading edge, at corresponding aerodynamic flight conditions as desired to provide reduction in drag as angle of attack is decreased, for example from 20° to about 0°.

Optionally, the external body surface 23 can have a geometry that is dependent on the design Reynolds number for the aerofoil. For example, the higher the design Reynolds number, the larger the local curvature of the external body surface 23, and conversely, the lower the design Reynolds number, the lower the local curvature of the external body surface 23.

Figure 9:
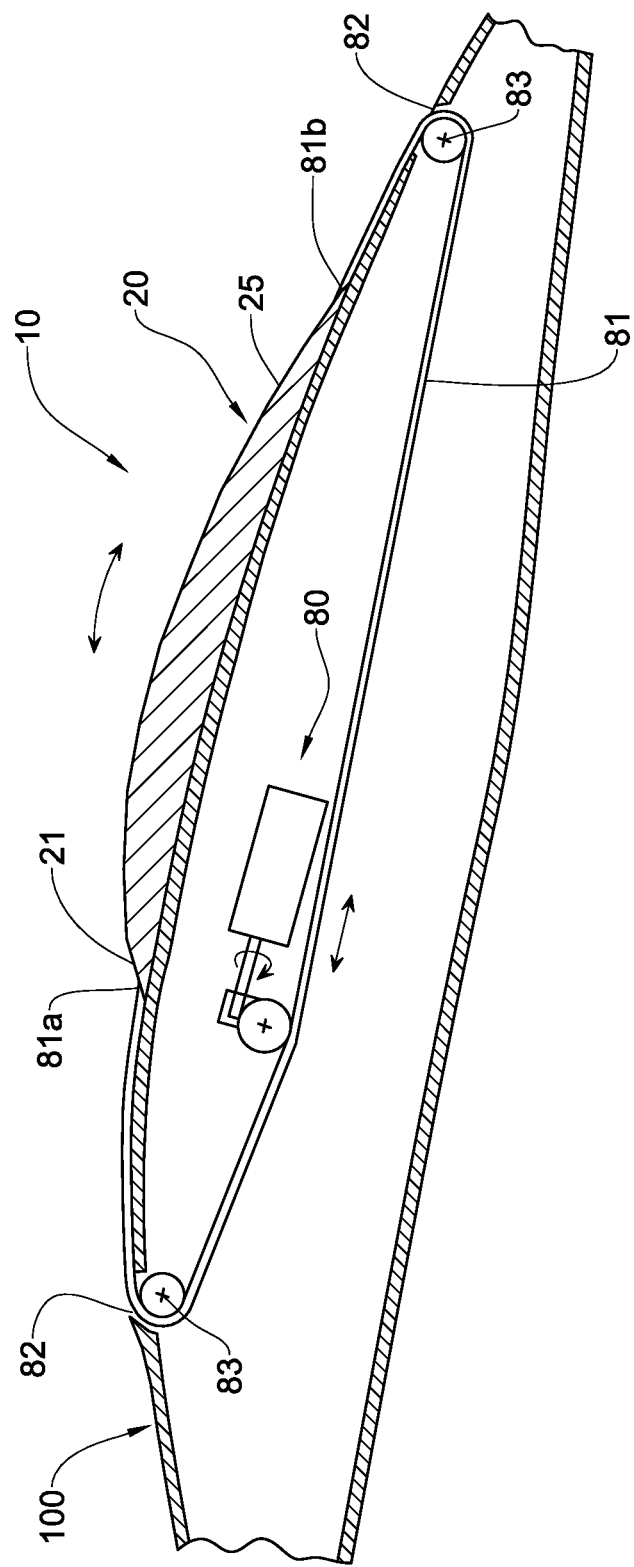
FIG. 9 is a partial cross-sectional side view of an example of a wing element comprising an example of a profile modifying device movably mounted thereto and illustrating an example of a motion inducing arrangement thereof.

An example of a motion inducing arrangement 80 is illustrated in FIG. 9. In this example, the motion inducing arrangement 80 comprises a movable belt 81 coupled at each end thereof 81*a*, 81*b* to a corresponding one of first edge 21 and second edge 25 of body 20 (see also FIG. 1). The belt enters the wing element 100 at forward and aft slots 82 and loops around a number of rollers 83, and thus portions of the belt 81 in proximity to ends 81*a*, 81*b* are overlaid on the external wing surface 59. Optionally, a recess (not shown) can be formed on the external wing surface 59, in particular between the body 20 and the two slots 82, and the depth of the recess can be is correlated to the thickness of the belt 81 so that the outer facing surface of belt 81 is generally flush with the external wing surface 59. A motor 84 selectively drives the belt over the rollers 83 thereby providing the aforesaid selective displacement between a variety of positions P with respect to said external wing surface 59, in particular correlated to the space between the two slots 82, and the body 20 can be anchored at any desired position using a suitable brake or lock that operates on the belt 81, for example. This example of motion inducing arrangement 80 can thus be used for providing the aforesaid displacement over the suction surface 56 when the slots 83 are provided on the suction surface 56, or for providing the aforesaid displacement over the pressure surface 57 when the slots 83 are provided on pressure surface 57.

Figure 10:
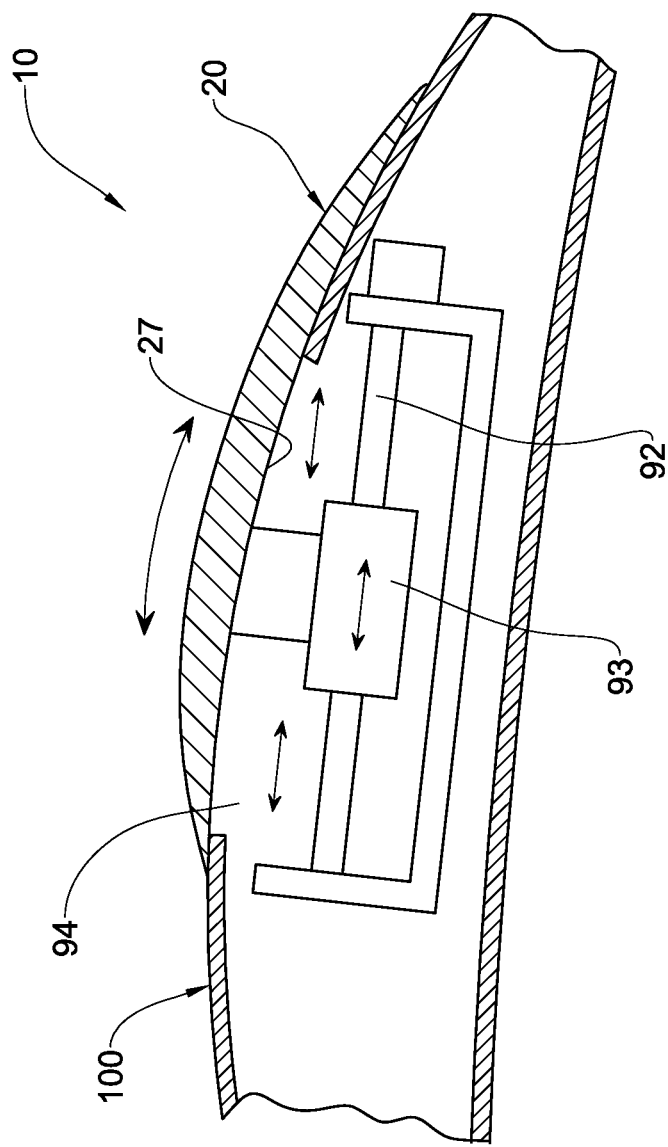
FIG. 10 is a partial cross-sectional side view of an example of a wing element comprising another example of a profile modifying device movably mounted thereto and illustrating another example of a motion inducing arrangement thereof.
Figure 11:
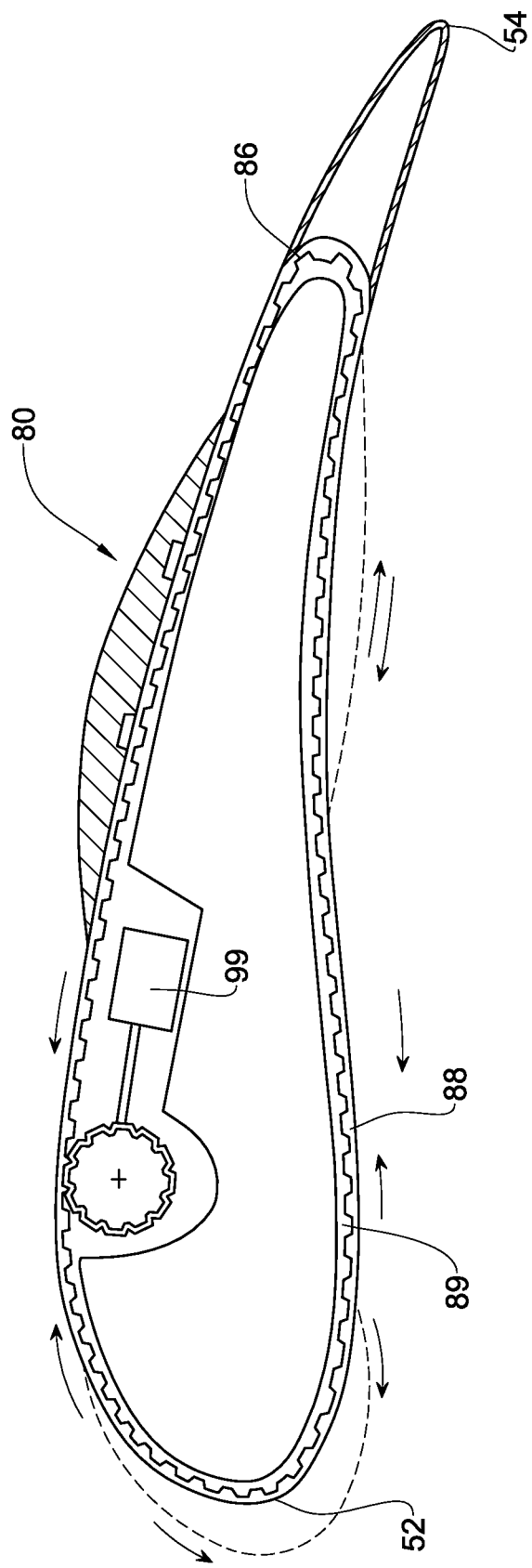
FIG. 11 is a partial cross-sectional side view of an example of a wing element comprising another example of a profile modifying device movably mounted thereto and illustrating another example of a motion inducing arrangement thereof.

Another example of a motion inducing arrangement 80 is illustrated in FIG. 10. In this example, the motion inducing arrangement 80 is housed within the wing element 100 and comprises a linear actuator, for example a mechanical, hydraulic, pneumatic or solenoid based piston arrangement or jack 92 that selectively drive a coupler 93 in a general chordwise direction. The coupler 93 is mechanically coupled to the interface 27 or to another part of the body 20 via a chordwise slot 94 provided in the external wing surface 59, and thus selectively displaces the body 20 between a variety of positions P with respect to said external wing surface 59, in particular correlated to the chordwise length of slot 94 and/or travel of the coupler 93 and jack 92, and the body 20 can be anchored at any desired position using a suitable brake or lock that operates on the jack 92, for example. This example of motion inducing arrangement 80 can thus be used for providing the aforesaid displacement over the suction surface 56 when the slot 94 is provided on the suction surface 56, or for providing the aforesaid displacement over the pressure surface 57 when the slot 94 is provided on pressure surface 57. Another example of a motion inducing arrangement 80 is illustrated in FIG. 11.

In this example, the motion inducing arrangement 80 comprises a movable continuous belt 88 looped around a recess 89 formed around most of the periphery of the external wing surface 59, in particular including the leading edge 52 and a majority of the suction surface 56 and pressure surface 57 from the leading edge 52, entering the wing element 100 and looping around a through slot 86 therein spaced from trailing edge 54. The depth of the recess 89 is correlated to the thickness of the belt 88 so that the outer facing surface 88*a* of belt 88 is generally flush with the external wing surface 59. The inner facing surface 88*b* of belt 88 is mechanically coupled to a motor 99 which, when operated, endlessly displaces the belt 88 along recess 89. The body 20 is coupled to the belt 88 at a particular location thereof, and thus as motor 99 selectively drives the belt 88 over the recess 89 the body 20 is correspondingly displaced over the external wing surface 59, thereby providing the aforesaid selective displacement between a variety of positions P with respect to said external wing surface 59, including such positions P on the suction surface 56, and/or on the pressure surface 57, the body 20 in particular the interface 27 being configured for conforming to the wide range of different curvatures of the external wing surface 59 encountered with such displacement. The body 20 can be anchored at any desired position P using a suitable brake or lock that operates on the belt 88, for example.

A suitable controller 200 (FIG. 1) can be provided to control operation of motion inducing arrangement 80 and thus for selectively controlling the position P of the body 20 on the external wing surface 59. The controller may comprise, for example, a computer, or an electronic controller, and can operate either in open loop mode or close loop mode. In closed loop mode, for example, the controller 200 receives inputs from sensors (not shown) indicative of aerodynamic flight conditions, and calculates the optimal position P for the body 20, according to predetermined parameters including where the air vehicle is in the predetermined mission profile, to thereby provide increased/decreased drag, mild stall, endurance, etc, and moves the body 20 to the required position P on the external wing surface 59 accordingly. In open loop mode, for example, the controller 200 calculates a variety of positions P for the body 20, according to predetermined parameters including where the air vehicle is in the mission profile (for example as a function of elapsed mission time), and moves the body 20 to the required position P on the external wing surface 59 accordingly.

Thus, movement of the body 20 with respect to the external wing surface 59 can be carried out while airborne, i.e., during aerodynamic flight, as well as when the air vehicle is on the ground.

Thus, the displacement of the body 20 over the external wing surface 59, in particular on the suction surface 56 and/or on the pressure surface 57 can improve performance of the wing element (and thus of the air vehicle) over at least some parts the flight envelope, as compared to the performance of the wing element (and thus of the air vehicle) in the absence of the body 20. At least some examples of such a device 10 may be used in UAV's or manned air vehicles, whether powered or unpowered. The position of the body 20 on the external wing surface 59 can be manually fixed (for example before takeoff, and retained at this position until the air vehicle lands, and thus provides one type of optimization), or may be controlled by a suitable computer or electronic controller, form example, according to a predetermined schedule and flight conditions, for example.

In the examples disclosed above, the device 10 is configured for selectively translating over the external wing surface of the wing element 100 in general chordwise or general forward-aft directions, or around part or all of the periphery of an aerofoil section. In other examples of the presently disclosed subject matter the device may be configured, additionally or alternatively, for selectively translating over the external surface of the wing element 100 in general spanwise (root-tip) directions.

FIGS. 12 to 19 were obtained using a flow program (MSES code) using the following parameters Re=200,000; amplification factor Ncr=9; Mach No. 0.1; NLF (free transition, except for FIG. 15 which is with forced transition).

While the above examples and variations thereof have been described in the context of a wing element based on a single element aerofoil, these examples also apply, mutatis mutandis, to two-element aerofoils.

Figure 20A:
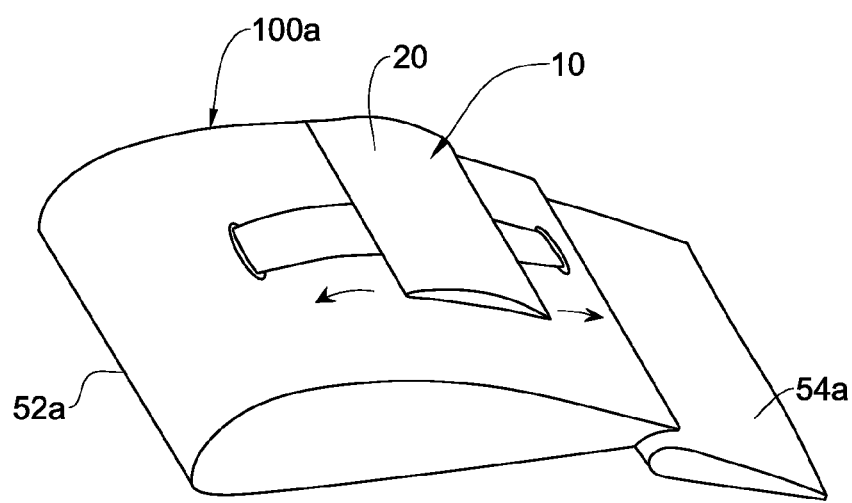
FIG. 20a is an isometric view of another example of a wing element comprising an example of a profile modifying device movably mounted thereto.
Figure 20B:
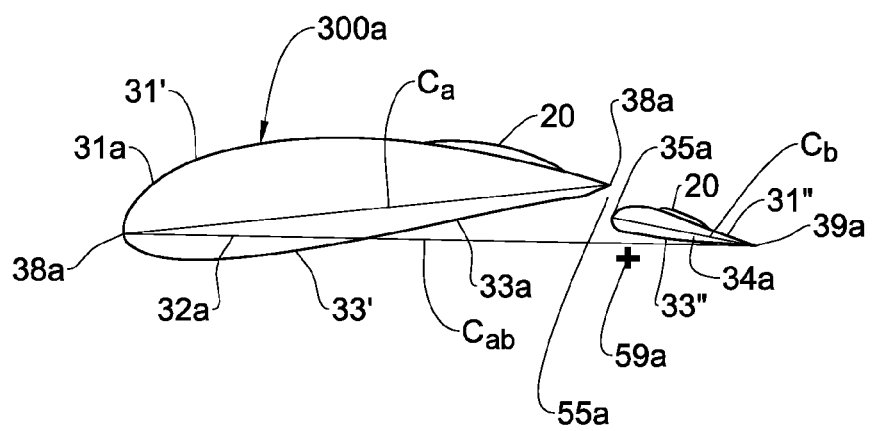
FIG. 20b is an aerofoil profile on which the wing element example of FIG. 20a is based.

Thus, in alternative variations of these examples and variations thereof, and referring to FIGS. 20a and 20b, the corresponding wing element 100a is based on a datum two-element slotted aerofoil 300a, having a substantially static primary element 32a and an optionally pivotable secondary element 34a. The primary element 32a comprises the leading edge 38a of the aerofoil, which coincides with the leading edge 52a of the wing element 100a, and major portions 31', 33', of the suction surface 31a and pressure surface 33a thereof, respectively, and a trailing end 38a. The secondary element 34a comprises the trailing edge 39a of the aerofoil, which coincides with the trailing edge 54a of the wing element 100a, and minor portions 31", 33", of the suction surface 31a and pressure surface 33a thereof, respectively. A slot 55a separates the leading portion 35a of the secondary element 34a from the trailing end 38a of the primary element 32a. For example, the slot 55a may have a width at least 1% of the aerofoil chord in a non-deflected position of the flap element, though the precise form and width size of the slot 55a generally depends on the particular mode of operation or other design consideration of the wing element. Optionally, the hinge point 59a of the secondary element 34a is outwardly displaced with respect to the lower (pressure) surface of the secondary element 34a. A suitable actuation mechanism (not shown) may optionally be provided for actuating the secondary element 34a to adopt the range of deflection angles desired. Additionally or alternatively, the secondary element 34a may be spatially and/or rotationally fixed with respect to the primary element 32a, and further optionally, the secondary element 34a may comprise control surfaces such as ailerons, flaps and so on, that are pivotable with respect to secondary element 34a.

While the aerofoil 300a defines chord $C_{ab}$ between leading edge 38a and trailing edge 39a, it is also useful to define a primary chord $C_a$ for primary element 32a (defined as the distance between leading edge 38a and the trailing end 38a), and a secondary chord $C_b$ for secondary element 34a (defined as the distance between leading portion 35a and the trailing edge 39a).

According to the example of FIGS. 20a and 20b, a device 10 may be movably mounted to wing element 100a, in particular the primary element 32a such that the body 20 is displaceable between at least two positions P, defined on the major portions 31', 33', of the suction surface 31a and pressure surface 33a, in a similar manner to that described above for the examples illustrated in FIGS. 1 to 19 and alternative variations thereof, mutatis mutandis, wherein the position P can be related to primary chord $C_a$ rather than the full chord $C_{ab}$ (or alternatively the position P can be related to the chord $C_{ab}$). Additionally or alternatively, a second device 10 may be movably mounted to wing element 100a, in particular the secondary element 34a such that the body 20 is displaceable between at least two positions P, defined on the minor portions 31", 33", of the suction surface 31a and pressure surface 33a, in a similar manner to that described above for the examples illustrated in FIGS. 1 to 19 and alternative variations thereof, mutatis mutandis, wherein the position P can be related to secondary chord $C_b$ rather than the full chord $C_{ab}$ (or alternatively the position P can be related to the chord $C_{ab}$).

It should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. A device for selectively providing a modified aerodynamic flow over a wing under aerodynamic flight conditions with respect to a respective datum aerodynamic flow over an external wing surface of the wing in the absence of the device under the aerodynamic flight conditions, the device comprising:
   a body including a body leading edge and a body trailing edge, the body being configured to be movably mounted to the wing for selective displacement between at least two different positions with respect to the external wing surface and having an external body surface, and
   a motion inducing arrangement coupled to the body and configured for providing the selective displacement,
   wherein in each of the at least two different positions, the body is in a respective superposed relationship with a different respective wing surface portion of the wing external surface and the modified aerodynamic flow includes airflow over the external body surface, and
   wherein in each of the at least two different positions and continuously during displacement of the body generally along a chord direction between the at least two different positions, the body leading edge and the body trailing edge are each in abutting contact with the external wing surface.

2. The device according to claim 1, configured for compelling the modified aerodynamic flow over the wing to be directed over the external body surface while concurrently preventing the modified aerodynamic flow over the wing to be directed over the respective wing surface portion.

3. The device according to claim 1, wherein the modified aerodynamic flow excludes an airflow over the respective wing surface portion that is superposed by the body.

4. The device according to claim 1, wherein the body is configured for selective displacement with respect to the external wing surface via sliding displacement between the body and the external wing surface.

5. The device according to claim 1, wherein the displacement includes at least one of:
   along a direction generally tangential to the wing external surface;
   along a general chord direction of the wing; or
   along a general span direction of the wing.

6. The device according to claim 1, wherein the external body surface extends between the body leading edge and the body trailing edge.

7. The device according to claim 6, wherein each one of the body leading edge and the body trailing edge being configured for being in sealing contact with the external wing surface in each of the at least two different positions, at least during operation of the device.

8. The device according to claim 7, wherein the body comprises a body thickness varying from a first minimum thickness at the body leading edge, a second minimum thickness at the body trailing edge, and a maximum body thickness therebetween.

9. The device according to claim 1, wherein the body comprises an interface configured for conforming the body to a profile of each the respective wing surface portion.

10. The device according to claim 9, wherein the body is conformable to the profile of each the respective wing surface portion.

11. The device according to claim 6, wherein the body leading edge and the body trailing edge are selectively spaceable from one another.

12. The device according to claim 1, wherein in a first position, the modified aerodynamic flow provides a wing drag reduction as compared with a datum wing drag provided by the datum aerodynamic flow over the wing in the absence of the device.

13. The device according to claim 12, wherein the first position corresponds to a position of a laminar-turbulent transition line on the external wing surface.

14. The device according to claim 12, wherein the first position is varied to coincide with a respective position of a laminar separation bubble on the external wing surface.

15. The device according to claim 1, further comprising at least one of a second position, a third position, or a fourth position, wherein:
   in the second position, the modified aerodynamic flow provides mild stall characteristics to the wing as compared with stall characteristics provided by the datum aerodynamic flow over the wing in the absence of the device;
   in the third position, the modified aerodynamic flow provides a wing drag increment as compared with a datum wing drag provided by the datum aerodynamic flow over the wing in the absence of the device; and
   in the fourth position, the modified aerodynamic flow provides a wing lift increment as compared with a datum wing lift provided by the datum aerodynamic flow over the wing in the absence of the device.

16. The device according to claim 1, wherein the aerodynamic flight conditions include laminar flight conditions.

17. The device according to claim 1, wherein the displacement is carried out during the aerodynamic flight conditions.

18. The device according to claim 1, wherein the motion inducing arrangement comprises any one of:
   a motor coupled to a strap for providing motion thereto, the strap being in at least partial overlying relationship with the external wing surface and connected to the body; and
   an actuator coupled to the body for providing motion thereto via a coupling.

19. The device according to claim 1, wherein the wing is based on one of:
   a single element aerofoil; or
   a two element aerofoil comprising a primary element, an optionally pivotable secondary element, and a slot therebetween.

20. A wing comprising the device according to claim 1.

21. An air vehicle comprising the wing according to claim 20.

22. A method for selectively providing a modified aerodynamic flow over a wing under aerodynamic flight conditions with respect to a respective datum aerodynamic flow over an external wing surface of the wing under the aerodynamic flight conditions, the method comprising
   movably mounting a body on the external wing surface, the body having an external body surface, the body including a body leading edge and a body trailing edge,
   selectively displacing the body between at least two different positions with respect to the external wing surface,
   wherein in each of the at least two different positions, the body is in a respective superposed relationship with a respective wing surface portion of the wing external surface and the modified aerodynamic flow includes airflow over the external body surface, and
   wherein in each of the at least two different positions and continuously during displacement of the body generally along a chord direction between the at least two different positions, the body leading edge and the body trailing edge are each in abutting contact with the external wing surface.

23. The method according to claim 22, wherein the displacement is along a direction generally tangential to the wing external surface.

24. A method for selectively providing a modified aerodynamic flow over a wing under aerodynamic flight conditions with respect to a respective datum aerodynamic flow over an external wing surface of the wing under said aerodynamic flight conditions, the method comprising:

- seating a body on said external wing surface, said body being moveable over the external wing surface and having an external body surface, the body including a body leading edge and a body trailing edge,
- selectively displacing said body between at least two different positions with respect to said external wing surface to follow changing positions of a laminar-turbulent transition line on said external wing surface at different aerodynamic conditions, wherein each said position of said body corresponds to a position of said laminar-turbulent transition line on said external wing surface,
- wherein at each said position said body is in a respective superposed relationship with a respective wing surface portion of the wing external surface and said modified aerodynamic flow includes airflow over said external body surface, and
- wherein in each of the at least two different positions and continuously during displacement of the body generally along a chord direction between the at least two different positions, the body leading edge and the body trailing edge are each in abutting contact with the external wing surface.

* * * * *